(12) United States Patent
Pillai et al.

(10) Patent No.: US 9,805,276 B2
(45) Date of Patent: Oct. 31, 2017

(54) GENERATING REAL-TIME DRIVER FAMILIARITY INDEX FOR FINE-GRAINED DYNAMIC ROAD SCENES

(71) Applicant: TOYOTA JIDOSHA KABUSHIKI KAISHA, Toyota-shi, Aichi-ken (JP)

(72) Inventors: Preeti J. Pillai, Sunnyvale, CA (US); Veeraganesh Yalla, Mountain View, CA (US); Rahul Ravi Parundekar, Sunnyvale, CA (US); Kentaro Oguchi, Menlo Park, CA (US)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 55 days.

(21) Appl. No.: 15/087,726

(22) Filed: Mar. 31, 2016

(65) Prior Publication Data

US 2017/0286782 A1    Oct. 5, 2017

(51) Int. Cl.
| | |
|---|---|
| *G06K 9/00* | (2006.01) |
| *G06K 9/62* | (2006.01) |
| *G01C 21/36* | (2006.01) |
| *B60W 40/08* | (2012.01) |
| *B60W 50/14* | (2012.01) |

(52) U.S. Cl.
CPC ......... *G06K 9/00805* (2013.01); *B60W 40/08* (2013.01); *B60W 50/14* (2013.01); *G01C 21/3691* (2013.01); *G06K 9/628* (2013.01); *G06K 9/6218* (2013.01)

(58) Field of Classification Search
CPC . G06K 9/00805; G06K 9/6218; B60W 50/14; B60W 40/08; G01C 21/3691
See application file for complete search history.

(56) References Cited

U.S. PATENT DOCUMENTS

| | | | |
|---|---|---|---|
| 7,974,748 B2 | 7/2011 | Goerick et al. | |
| 2002/0128751 A1 | 9/2002 | Engstrom et al. | |
| 2008/0154438 A1 | 6/2008 | Kalik | |
| 2013/0322692 A1* | 12/2013 | Guan ................. | G06K 9/00791 382/103 |
| 2015/0032424 A1* | 1/2015 | Gupta ................ | G01C 21/3641 703/2 |

FOREIGN PATENT DOCUMENTS

| | | |
|---|---|---|
| JP | 2005195536 | 7/2005 |
| WO | 2015013042 | 1/2015 |

* cited by examiner

*Primary Examiner* — Siamak Harandi
(74) *Attorney, Agent, or Firm* — Patent Law Works LLP

(57) ABSTRACT

In an example embodiment, a computer-implemented method is disclosed that generates a spectral signature describing one or more dynamic objects and a scene layout of a current road scene; identifies, from among one or more scene clusters included in a familiarity graph associated with a user, a road scene cluster corresponding to the current road scene; determine a position of the spectral signature relative to other spectral signatures comprising the identified road scene cluster; and generates a familiarity index estimating familiarity of the user with the current road scene based on the position of the spectral signature. The method can further include determining an assistance level based on the familiarity index of the user; and providing one or more of an auditory instruction, a visual instruction, and a tactile instruction to the user via one or more output devices of a vehicle at the determined assistance level.

24 Claims, 10 Drawing Sheets

GENERATING REAL-TIME DRIVER FAMILIARITY INDEX FOR FINE-GRAINED DYNAMIC ROAD SCENES

BACKGROUND

The present disclosure relates to road scene familiarity.

Existing solutions for determining driver road scene familiarity often rely on the driving history of the user and route information of a particular route. In general, these existing systems need to know what road segment the user is currently travelling on, whether the user has driven on the road segment before, and how often the user has taken that road segment in the past. These route-based approaches do not take into consideration dynamic road situations, which are influenced by road environmental conditions at a specific point in time. As a result, these existing techniques are generally unable to compute user familiarity with a route-independent road scene having dynamic road conditions.

Furthermore, the route information used by these existing systems usually consists of general knowledge about the road, e.g., describes the roads at a high level with general road attributes. As a result, these existing techniques also cannot provide a reliable familiarity score at fine-grained level (e.g., street level) when the user is facing a particular driving situation from his or her driving position.

SUMMARY

According to one innovative aspect of the subject matter described in this disclosure, a system includes one or more processors and one or more memories storing instructions that, when executed by the one or more processors, cause the system to: generate a spectral signature describing one or more dynamic objects and a scene layout of a current road scene; identify, from among one or more scene clusters included in a familiarity graph associated with a user, a road scene cluster corresponding to the current road scene; determine a position of the spectral signature relative to other spectral signatures comprising the identified road scene cluster; and generate a familiarity index estimating familiarity of the user with the current road scene based on the position of the spectral signature.

In general, another innovative aspect of the subject matter described in this disclosure may be embodied in methods that include generating a spectral signature describing one or more dynamic objects and a scene layout of a current road scene; identifying, from among one or more scene clusters included in a familiarity graph associated with a user, a road scene cluster corresponding to the current road scene; determining a position of the spectral signature relative to other spectral signatures comprising the identified road scene cluster; and generating a familiarity index estimating familiarity of the user with the current road scene based on the position of the spectral signature.

Other aspects include corresponding methods, systems, apparatus, and computer program products for these and other innovative aspects.

These and other implementations may each optionally include one or more of the following features and/or operations. For instance, the features and/or operations include: that generating the spectral signature describing the one or more dynamic objects and the scene layout of the current road scene includes capturing a road scene image of a roadway at a particular point in time using one or more sensors of a vehicle directed to the roadway, and generating the spectral signature including a signature vector using the road scene image; that identifying the road scene cluster corresponding to the current road scene includes categorizing the current road scene into a macro-scene category using the spectral signature, and retrieving the road scene cluster including a plurality of historical spectral signatures associated with the macro-scene category, the plurality of historical spectral signatures including a plurality of historical signature vectors, respectively; that the position of the spectral signature is a position of the signature vector and that determining the position of the spectral signature relative to the other spectral signatures includes determining the position of the signature vector relative to respective positions of the plurality of historical signature vectors of the road scene cluster; that the macro-scene category includes one of an urban category, a rural category, a residential category, a construction zone category, a highway category, and an accident category; updating the road scene cluster to include the spectral signature; that generating the familiarity index estimating the familiarity of the user with the current road scene includes determining a set of nested familiarity zones for the road scene cluster based on a density of spectral signatures within the road scene cluster, and determining the familiarity index of the user to the current road scene by determining the position of the spectral signature within the set of nested familiarity zones; determining an assistance level based on the familiarity index of the user, and providing one or more of an auditory instruction, a visual instruction, and a tactile instruction to the user via one or more output devices of a vehicle at the determined assistance level; that the assistance level includes one or more of 1) a frequency for providing the one or more of the auditory instruction, the visual instruction, and the tactile instruction to the user, and 2) a level of detail of the one or more of the auditory instruction, the visual instruction, and the tactile instruction; that the current road scene is depicted in a road scene image being captured at a particular point in time, and determining physiological data associated with the user at the particular point in time, generating a physiological weight value based on the physiological data, and augmenting the spectral signature using the physiological weight value; that the physiological data associated with the user includes one or more of head movement, eye movement, electrocardiography data, respiration data, skin conductance, and muscle tension of the user at the particular point in time; determining historical navigation data associated with the user, generating a historical navigation weight value based on the historical navigation data, and augmenting the spectral signature using the historical navigation weight value; and that the historical navigation data associated with the user includes one or more of a road name, a road type, road speed information, and time information associated with one or more road segments previously travelled by the user.

The novel technology presented in this disclosure is particularly advantageous in a number of respects. For example, the technology described herein can generate familiarity index of the user to various dynamic road driving situations occurring in real-time when the user is driving on the roadway. In particular, the present technology processes, stores and compares spectral signatures of driving conditions currently ahead of the user against spectral signatures of historical road scenes the user has confronted in his driving history. Under this approach, the present technology can take into account personal driving experience of the user when he/she encounters a specific road driving situation during a journey. Also, the technology disclosed herein can automatically generate driver familiarity index for different road types, different road scene situations/traffic conditions, and at different times of day even if the road information of the current roadway is unavailable.

The technology as disclosed herein analyzes the current outside road scene at a macro-scene level and at a micro-scene level (e.g., a fine-grained level as seen from the driver's viewpoint), and thereby can reduce computational cost. Furthermore, the technology disclosed herein also utilizes user sensory data, driving history of the user and road information of the current roadway as supplemental information in computing driver familiarity metric. The present technology can therefore further enhance the estimated familiarity of the user with a particular road scene locality.

The technology as disclosed herein can effectively compute a real-time familiarity index corresponding to a dynamic driving condition the user is currently dealing with. As a result, the present technology can proactively provide the user with necessary assistance at appropriate level and avoid creating undesired distraction, thereby improve driving experience and safety of the user. It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

DESCRIPTION

Figure 1:
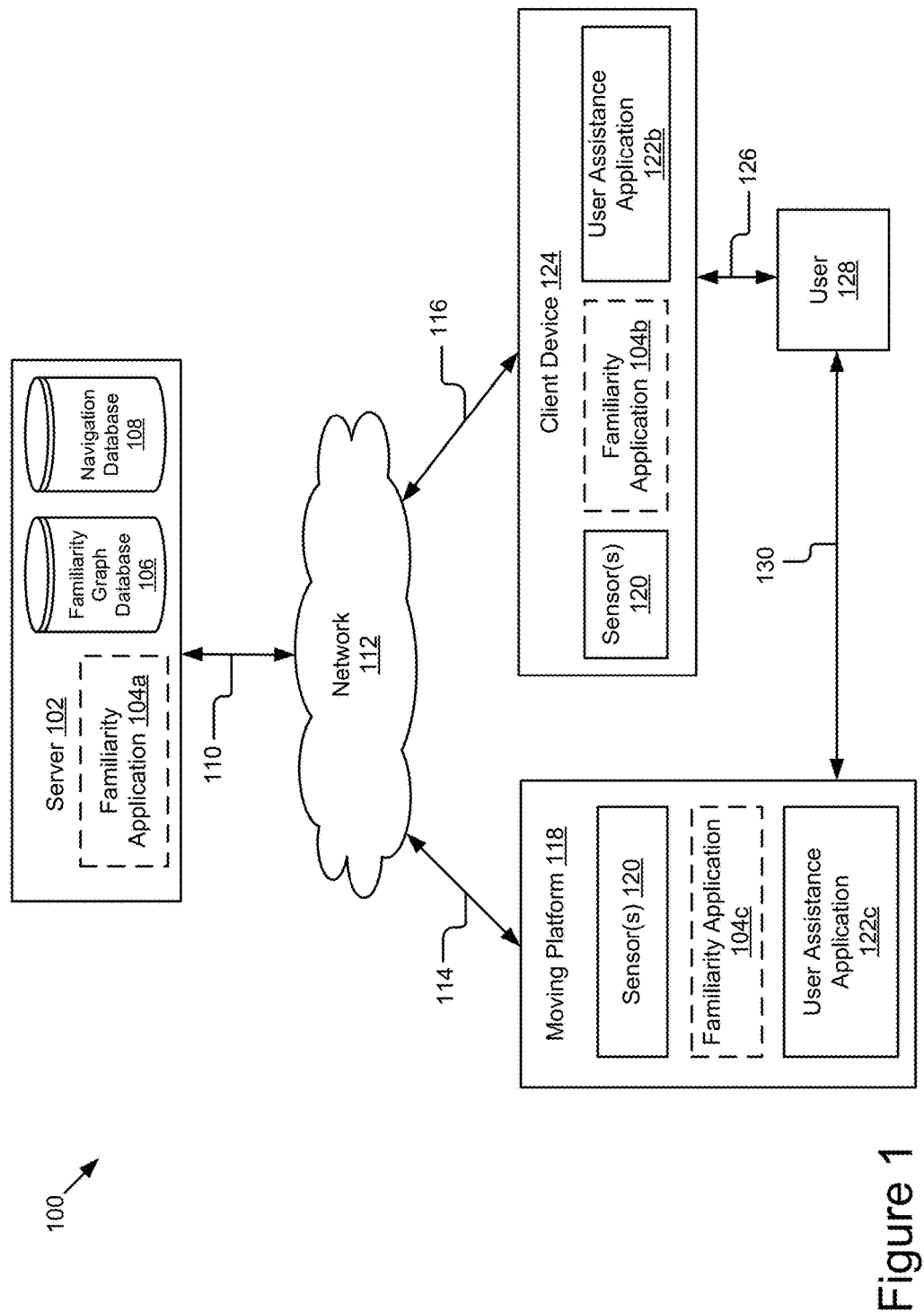
FIG. 1 is a block diagram of an example system for generating driver familiarity index.

The technology described herein is capable of automatically determining road-scene familiarity at a fine-grained level.

As described below, in some embodiments, the present technology may determine scene familiarity by generating a road scene familiarity index for a user in real-time conditions using one or more sensors of a vehicle (e.g., a roadway camera). In some cases, the technology may generate a driver familiarity index using multiple levels of scene complexity. In particular, the familiarity index of a user to a particular road scene may be computed using road scene information at a macro-scene level (also referred to herein as macro-scene information) and road scene information at a micro-scene level (also referred to herein as micro-scene information).

Macro-scene information describes the outside road scene at a high level. In particular, the macro-scene information may provide a high-level, general overview of the outside scene which is relatively non-dynamic and in general does not drastically change in time. For example, the macro-scene information may indicate a macro-scene category that describes a type of location (e.g., locality) associated with the outside road scene. Non-limiting examples of a macro-scene category include city, urban, rural, highway, expressway, residential area, construction zone, accident, etc. The macro-scene information may additionally include any other general roadway characteristics, such as the number of lanes, speed limit, etc., of a road segment of interest.

The micro-scene information describes the current road scene at fine-grained level. In contrast to macro-scene information, micro-scene information may include more granular details about the different aspects of the macro road scene. Non-limiting examples of different types of micro-scene information may include drivable lane width (e.g., half of the original lane width), number of open lanes (e.g., two left lanes and two right lanes are currently opened, the middle lane is closed due to a severe car accident), status of traffic light (e.g., flashing red light at intersection between Washington St. and White St.), intersection (e.g., the intersection is blocked by two police cars), surrounding vehicle layout (e.g., vehicle of the user is boxed-in by other halted vehicles in crowded traffic), object type of the dynamic objects (e.g., construction cones, road barricades, construction vehicles, pedestrians, road workers, etc.), number (e.g., count) of each object type, relative position and/or spatial distribution of the dynamic objects within the road scene, etc. As a further example, for a current "urban" road scene identified by the macro-scene information, the micro-scene information may include street-level detail as perceived from perspective of the driver in his driving position. Any of the details included in the micro-scene information may be temporal. For example, the details included in micro-scene information may advantageously describe dynamic driving context associated with the road scene at a specific point in time.

Figure 8:
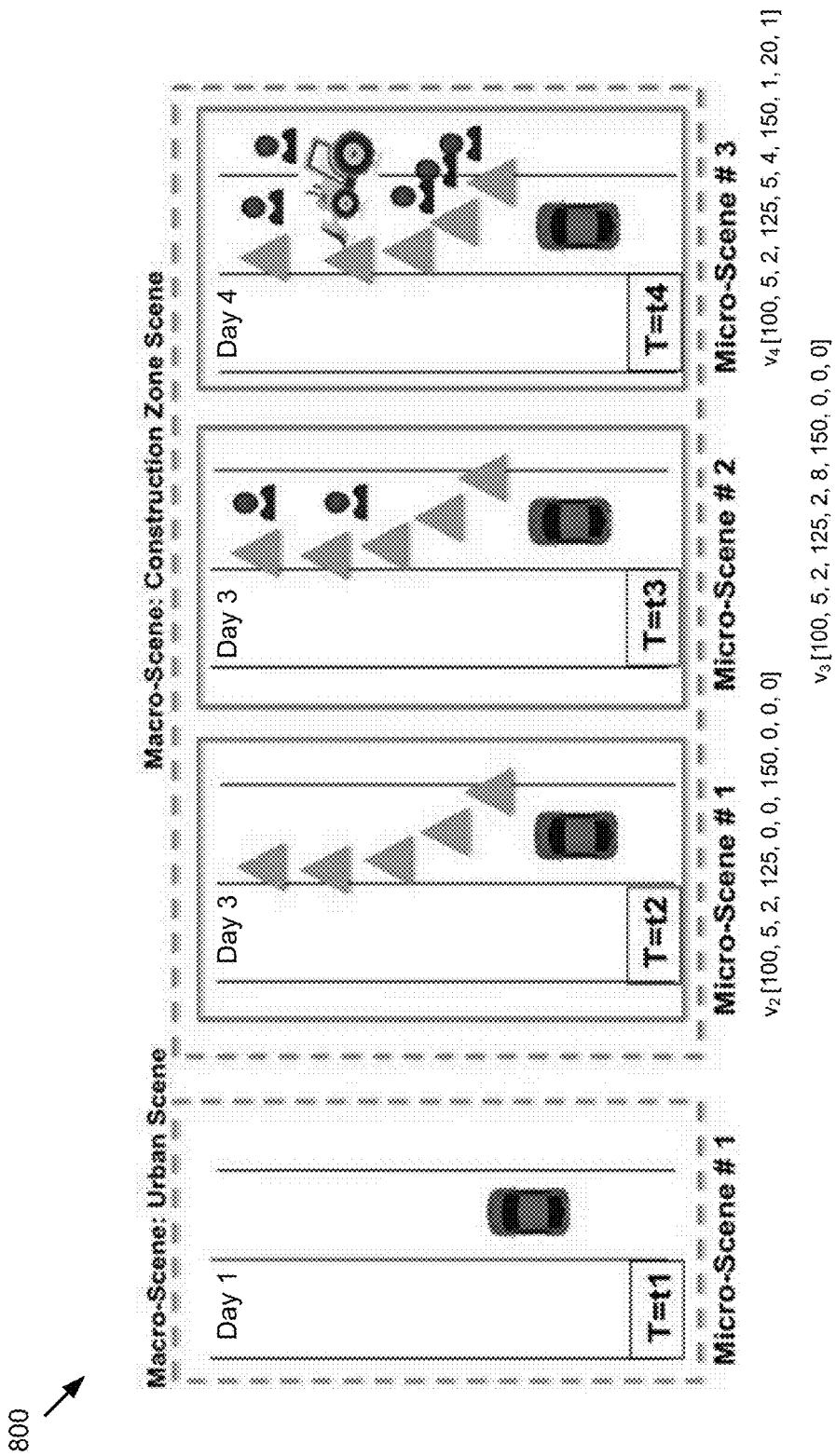
FIG. 8 depicts example road scene structures at macro-scene level and micro-scene level associated with various road scenes at a particular location.

FIG. 8 depicts examples of macro-scene level and micro-scene level road scene details at a particular location. As illustrated, the road scene information at micro-scene level may vary significantly as the driver drives through the same location on different days and/or at different times of day. As an example, a user usually takes State St. in a downtown area to get to his office every day. Although the user is generally familiar with this urban area, the driving situations the user experiences may be greatly different for each journey and the user may be unfamiliar with one or more of those specific driving situations.

For instance, in the example scenarios depicted in FIG. 8, at time t=t1 on day 1, the user is travelling along State St. The road is clear and the user drives smoothly through the location. The macro-scene information indicates that the road scene at the time t1 is categorized as urban road scene. The micro-scene information describes the "urban" road scene at the time t=t1 as a clear road. In contrast, at the time t=t2 on day 3, State St. is under construction and five construction cones are placed on the road. The user has to switch from the right lane to the left lane to avoid the work zone and continue travelling. At the macro-scene level, the road scene at the time t=t2 is now categorized as a construction road scene. The micro-scene information indicates that the road scene at the time t=t2 includes five construction cones. At time t=t3 on day 3, there are two road workers working in the same work zone. The user switches to the left lane and slows down when driving through that area. The road scene at the time t=t3 is still classified into the macro-scene category of construction zone. The micro-scene information describes five construction cones and two road workers present in the road scene at the time t=t3. At the time t=t4 on day 4, there are five road workers and a construction vehicle working in the construction zone. The road scene at the time t=t4 is still classified into the macro-scene category of construction zone. The micro-scene information indicates that five construction cones, five road workers and a construction vehicle are present in the road scene at the time t=t4. Advantageously, the technology uses the macro and micro-scene information described herein to notify the user of the potential hazard, which allows the user to switch to the left lane and slow down ahead of time, and thus be prepared for any additional hazards that my present themselves. This lowers the risk of an accident or other unfortunate event as the user drives through the work zone.

In some embodiments, the micro-scene information may further include scene layout describing relative positions and spatial distribution of these construction cones, construction vehicles and road workers in the work zone. Continuing the above example, while the user may be familiar with the macro road scene (e.g., urban road scene) as part of his routine commute, the user may not be familiar with the micro road scene (e.g., specific layout of the construction zone). For example, the user may be familiar with encountering a work zone having traffic cones and barricades (e.g., the micro scene at the time t=t2) but may not be familiar with the specific configuration of this construction zone (placement of road workers and working construction vehicles). The technology can advantageously assist the user by providing the user with specific instructions on how to navigate that specific construction zone (at the time t=t4).

FIG. 1 is a block diagram of an example system 100 for determining road scene familiarity. The illustrated system 100 includes a server 102, a client device 124, and a moving platform 118. The entities of the system 100 are communicatively coupled via a network 112. It should be understood that the system 100 depicted in FIG. 1 is provided by way of example and the system 100 and/or further systems contemplated by this disclosure may include additional and/or fewer components, may combine components and/or divide one or more of the components into additional components, etc. For example, the system 100 may include any number of servers 102, client devices 124, and/or moving platforms 118. Additionally or alternatively, the system 100 may include a speech server for receiving and processing speech commands from a user, a search server for providing search results matching search queries, etc.

The network 112 can be a conventional type, wired or wireless, and may have numerous different configurations including a star configuration, token ring configuration, or other configurations. Furthermore, the network 112 may include one or more local area networks (LAN), wide area networks (WAN) (e.g., the Internet), public networks, private networks, virtual networks, peer-to-peer networks, and/or other interconnected data paths across which multiple devices may communicate. For example, the network 112 may include a vehicle-to-vehicle network, a vehicle-to-infrastructure/infrastructure-to-vehicle network, etc.

The network 112 may also be coupled to or include portions of a telecommunications network for sending data in a variety of different communication protocols. In some embodiments, the network 112 includes Bluetooth communication networks or a cellular communications network for sending and receiving data including via short messaging service (SMS), multimedia messaging service (MMS), hypertext transfer protocol (HTTP), direct data connection, WAP, email, etc. In some embodiments, the network 112 is a wireless network using a connection such as DSRC, WAVE, 802.11p, a 3G, 4G, 5G+ network, WiFi™, or any other wireless networks. Although FIG. 1 illustrates a single block for the network 112 that couples to the server 102, the client device 124, and the moving platform 118, it should be understood that the network 112 may in practice comprise any number of combination of networks, as noted above.

The server 102 can include a hardware and/or virtual server that includes a processor, a memory, and network communication capabilities (e.g., a communication unit). The server 102 may be communicatively coupled to the network 112, as reflected by signal line 110. In some embodiments, the server 102 can send and receive data to and from one or more of the client device 124, and the moving platform 118. The server 102 may include an instance of the familiarity application 104a, a familiarity graph database 106, and a navigation database 108, as discussed further elsewhere herein.

The familiarity graph database 106 may store familiarity graphs generated for each user of the system. The familiarity graph is set of data describing historical road scenes. Each familiarity graph may be associated with a specific user or users. In some embodiments, the data of a familiarity graph may include a distribution of spectral signatures describing historical road scenes a corresponding user has experienced. The system 100 may learn new road scenes that the user has been exposed to and may develop that user's familiarity graph over time.

In some embodiments, the proximity between two given data points in a familiarity graph may indicate the similarity between their respective spectral signatures. As a result, the spectral signatures in the familiarity graphs may cluster together according to various characteristics, such as a macro-scene attribute, a micro-scene attribute, etc. For instance, various data points may cluster around a macro-scene category (e.g., freeway, construction zone, etc.) because of their similarity in scene composition and scene layout.

The familiarity graph can be generated in, and have, any form of data representation. For example, a familiarity graph may be represented as a visual graph, graphical plot, vector space, in structured data format, etc. Other examples, variations and/or combinations are also possible and contemplated. An example of a familiarity graph is described in further detail below with reference to at least FIGS. 4B, 4C and 9.

Figure 7:
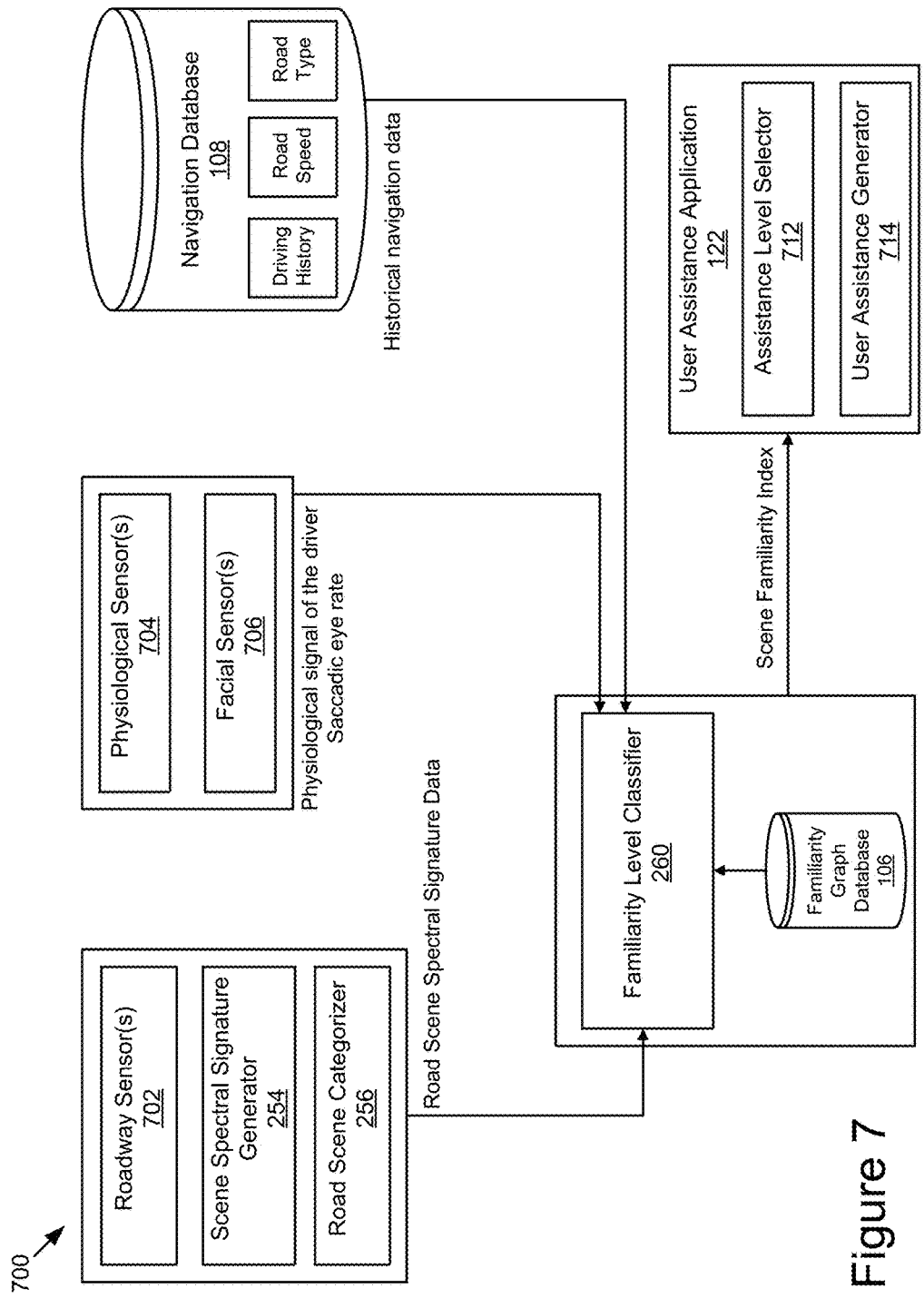
FIG. 7 illustrates a block diagram of a driver assistance system for providing instructions to a user based on a familiarity index.

The navigation database 108 may store navigation-related data. Examples include mapping data, path data, points of interest, user trip history(ies), etc. In some embodiments, the navigation-related data may include historical navigation data describing driving history of each user and/or route data associated with historical journeys previously taken by the user, as illustrated in FIG. 7. Non-limiting examples of historical navigation data include a list of road names associated with road segments the user has travelled in the past, road type of the road segment (e.g., urban, rural, residential, freeway, etc.), road speed information (e.g., speed limit of the road segment, actual speed of the user, etc.), time information (e.g., dates and times of day the user has previously travelled on the road segment, number of times the user has travelled on the road segment, etc.), ease-of-drive metric associated with the road segment (e.g., low, moderate, high, easy, difficult, etc.), etc.

In FIG. 1, the server 102 is shown as including familiarity graph database 106 and the navigation database 108, however it should be understood that the moving platform 118 and/or client device 124 may additionally and/or alternatively store the familiarity graphs and/or historical navigation data. For example, the moving platform 118 and/or client device 124 may include an instance of the familiarity graph database 106 and/or the navigation database 108, may cached and/or replicated data from the familiarity graph database 106 and/or the navigation database 108 (e.g., download the familiarity graphs and/or the historical navigation data at various intervals), may recent data pushed to the server 102 at various increments, etc. For example, the familiarity graphs and/or the historical navigation data may be pre-stored/installed in the moving platform 118, stored and/or refreshed upon setup or first use, replicated at various intervals, etc. In further embodiments, data from the familiarity graph database 106 and/or the navigation database 108 may be requested/downloaded at runtime. Other suitable variations are also possible and contemplated.

The client device 124 is a computing device that includes a memory, a processor, and a communication unit. The client device 124 may couple to the network 112 and can send and receive data to and from one or more of the server 102 and the moving platform 118 (and/or any other components of the system coupled to the network 112). Non-limiting examples of a client device 124 include a laptop computer, a desktop computer, a tablet computer, a mobile telephone, a personal digital assistant (PDA), a mobile email device, or any other electronic device capable of processing information and accessing a network 112. In some embodiments, the client device may include one or more sensors 120.

In some embodiments, the client device 112 may include an instance of a user assistance application 122*b*, which provides driving instructions to the user at a frequency and level of detail corresponding to the familiarity of the user with the road situation ahead. The user 128 can interact with the client device 124, as illustrated by line 126. Although FIG. 1 illustrates one client device 112, the system 100 can include one or more client devices 112.

The moving platform 118 includes a computing device having memory, a processor, and a communication unit. Examples of such a processor may include an electronic control unit (ECU) or other suitable processor, which is coupled to other components of the moving platform 118, such as one or more sensors, actuators, motivators, etc. The moving platform 118 may be coupled to the network 112 via signal line 114, and may send and receive data to and from one or more of the server 102 and the client device 124. For example, the moving platform 118 may keep track of driving history of the user, collect and store the driving history and associated route information in the navigation database 108. In some embodiments, the moving platform 118 is capable of transport from one point to another. Non-limiting examples of a mobile platform 118 include a vehicle, an automobile, a bus, a boat, a plane, a bionic implant, or any other mobile system with non-transitory computer electronics (e.g., a processor, a memory or any combination of non-transitory computer electronics). The user 128 can interact with the moving platform 118, as reflected by line 130. The user 128 may be a human user operating the moving platform 118. For example, the user 128 may be a driver of a vehicle.

The moving platform 118 can include one or more sensors 120 and an instance of a user assistance application 122*c*. Although FIG. 1 illustrates one moving platform 118, the system 100 can include one or more moving platforms 118.

The sensors 120 may include any type of sensors suitable for the moving platform 118 and/or the client device 124. The sensors 120 may be configured to collect any type of data suitable to determine characteristics of a computing device and/or its surrounding environment. Non-limiting examples of sensors 120 include various optical sensors (CCD, CMOS, 2D, 3D, light detection and ranging (LIDAR), cameras, etc.), audio sensors, motion detection sensors, barometers, altimeters, thermocouples, moisture sensors, IR sensors, radar sensors, other photo sensors, gyroscopes, accelerometers, speedometers, steering sensors, braking sensors, switches, vehicle indicator sensors, windshield wiper sensors, geo-location sensors, transceivers, sonar sensors, ultrasonic sensors, touch sensors, proximity sensors, etc. As illustrated in FIG. 7, the one or more sensors 120 may include one or more roadway sensor 702, one or more physiological sensor(s) 704, and one or more facial sensor(s) 706.

Figure 2A:
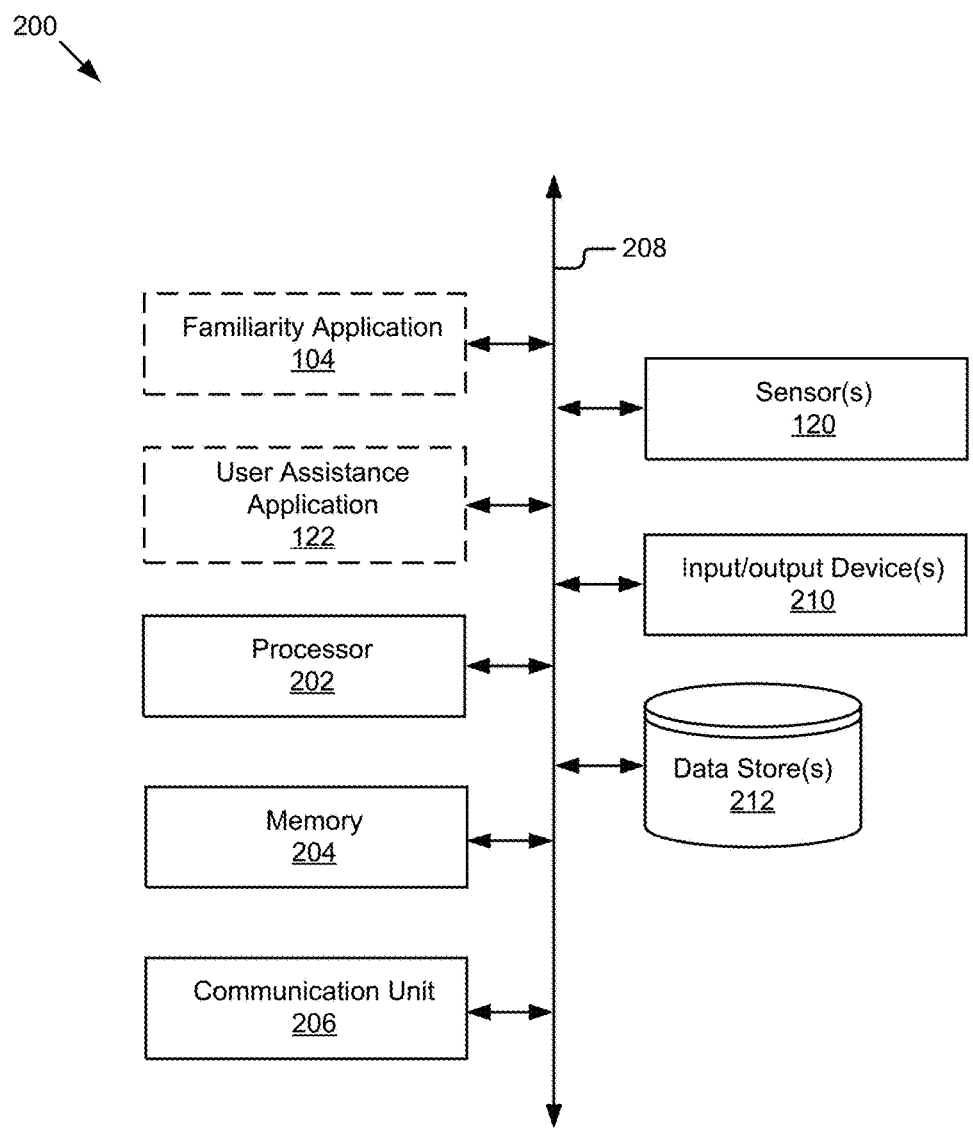
FIG. 2A is a block diagram of an example computing device.

In some embodiments, the roadway sensors 702 may include one or more optical sensors facing the roadway and configured to record images including video images and still images of an outside environment; may record frames of a video stream using any applicable frame rate, and may encode and/or process the video and still images captured using any applicable methods; can capture road scene images of surrounding environments within their sensor range. For example, in the context of a moving platform, the roadway sensors 702 can capture the environment around the moving platform 118 including roadways, sky, mountains, roadside structure, buildings, trees, dynamic objects and/or static objects (e.g., lanes, traffic signs, road markings, etc.) located along the roadway, etc. In some embodiments, dynamic objects may include road objects that their presence in the road scene or their position may dynamically change each time the user drives through the same location. Non-limiting examples of dynamic objects include surrounding moving platform 118*s*, construction vehicles, pedestrians, road workers, traffic cones, barricades etc. In some embodiments, the roadway sensors 702 may be mounted to sense in any direction (forward, rearward, sideward, upward, downward, facing etc.) relative to the path of the moving platform 118. In some embodiments, one or more roadway sensors 702 may be multidirectional (e.g., LIDAR). In some embodiments, the road scene images captured by the roadway sensors 702 may be processed to determine the familiarity index of the user in real-time. In some embodiments, the road scene images may be stored in one or more data storages, e.g. data store(s) 212 as depicted in FIG. 2A, for later processing and/or analysis.

In some embodiments, the facial sensor(s) 706 may include one or more optical sensors facing individual(s) in the moving platform 118 to capture images of those individual(s). For example, the facial sensor(s) 706 may face a driver (user) in the driver's seat and may be configured to record images including video images and still images; may record frames of a video stream using any applicable frame rate, and may encode and/or process the video and still images captured using any applicable methods. In some embodiments, the facial sensor(s) 706 can collect behavioral data of a user 128 (e.g., the driver) by monitoring that user's activities (e.g., head movement) and/or facial expressions (e.g., eyelid motions, saccadic eye movements, etc.). For example, the facial sensor(s) 706 may monitor the user's head position to determine whether the user is facing a right direction. As a further example, the facial sensor(s) 706 may detect the upper and lower eyelids to determine whether the eyes of the user are open properly. The behavioral data of the user captured by the facial sensor(s) 706 are discussed in further detail below with reference to at least FIGS. 6 and 7.

In some embodiments, the physiological sensor(s) 704 may include one or more biosensors configured to measure and monitor physiological signals of the user when driving. Examples of physiological signals being captured may include, but are not limited to, electrocardiography signals (e.g., ECG/EKG signal), respiration signal, skin conductance, skin temperature, muscle tension, etc. The physiological signals are discussed in further detail below with reference to at least FIGS. 6 and 7.

A processor (e.g., see FIG. 2A) of the moving platform 118 and/or the client device 124 may receive and process the sensor data. In the context of a moving platform 118, the processor may include, coupled to, or otherwise associated with an electronic control unit (ECU) implemented in a moving platform 118 such as a car, although other moving platform types are also contemplated. The ECU may receive and store the sensor data as vehicle operation data in a vehicle CAN (Controller Area Network) data store for access and/or retrieval by the familiarity application 104. In further examples, the vehicle operation data may be more directly provided to the familiarity application 104 (e.g., via the vehicle bus, via the ECU, etc., upon being received and/or processed). Other suitable variations are also possible and contemplated. As a further example, one or more sensors 120 can capture image data from the moving platform 118 (e.g., a vehicle) travelling on a road segment, where the image data depicts a scene including the road segment. The familiarity application 104 may receive the image data (e.g., real-time video stream, a series of static images, etc.) from the sensor(s) 120 (e.g., via the bus, ECU, etc.) and process it to determine the familiarity index, as discussed further elsewhere herein.

The server 102, the moving platform 118, and/or the client device 124 may include instances 104a, 104b, and 104c of the familiarity application (also referred to herein as simply 104). In some configurations, the familiarity application 104 may be distributed over the network 112 on disparate devices in disparate locations, in which case the client device 124, the moving platform 118, and/or the server 102 may each include an instance of the familiarity application 104 comprising aspects (same, similar, different, etc.) of the familiarity application 104. For example, each instance of the familiarity application 104a, 104b, and 104c may comprise one or more of the sub-components depicted in FIG. 2B, and/or different variations of theses sub-components, which are discussed in further detail below. In some configurations, the familiarity application 104 may be a native application comprising all of the elements depicted in FIG. 2B, for example.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some embodiments may include additional or fewer computing devices, services, and/or networks, and may implement various functionality client or server-side. Further, various entities of the system may be integrated into a single computing device or system or divided into additional computing devices or systems, etc.

The familiarity application 104 includes software and/or or hardware logic executable to determining scene familiarity of users. As discussed elsewhere herein, in some embodiments, for a given user, the familiarity application 104 may process sensor data, generate multi-level signature representation describing a road scene, and generate a familiarity index reflecting the familiarity of the user with the road scene. In some embodiments, the familiarity application 104 can be implemented using software executable by one or more processors of one or more computer devices, using hardware, such as but not limited to a field-programmable gate array (FPGA), an application-specific integrated circuit (ASIC), etc., and/or a combination of hardware and software, etc. The familiarity application 104 is described below in more detail with reference to at least FIGS. 2-7.

The moving platform 118 and/or the client device 124 may include instances 122b and 122c of a user assistance application (also referred to herein as simply 122). In some configurations, the user assistance application 122 may be distributed over the network 112 on disparate devices in disparate locations, in which case moving platform 118 and/or the client device 124 may each include an instance of the user assistance application 122 comprising aspects (same, similar, different, etc.) of the user assistance application 122. For example, each instance of the familiarity application 122b and 122c may comprise one or more of the sub-components depicted in FIG. 7, and/or different variations of theses sub-components, which are discussed in further detail below. In some configurations, the user assistance application 122 may be a native application comprising all of the elements depicted in FIG. 7, for example. Other variations and/or combinations thereof are also possible and contemplated.

The user assistance application 122 includes software and/or hardware logic executable to provide user assistance to users based on road scene familiarity. In some embodiments, as discussed elsewhere herein, the user assistance application 122 may provide instructions to a user in real-time and at an appropriate level depending on the user's familiarity to the road scene situation ahead. As a further example, In some embodiments, an instance of a user assistance application 122, operating at least in part on the moving platform 118 and/or a client device 124 of the user, can provide the user assistance instructions, determined based on a familiarity index determined by the familiarity application 104, to the user via one or more output devices of the mobile platform 118 and/or a client device 124 (e.g., a speaker system, a graphical user interface displayed on a display, etc.).

In some embodiments, the user assistance application 122 can be implemented using software executable by one or more processors of one or more computer devices, using hardware, such as but not limited to a field-programmable gate array (FPGA), an application-specific integrated circuit (ASIC), etc., and/or a combination of hardware and software, etc. The user assistance application 122 is described below in more detail with reference to at least FIG. 7.

FIG. 2A is a block diagram of a computing device 200, which may represent the architecture of any of a server 102, a moving platform 118, or a client device 124.

As depicted, the computing device 200 includes one or more processor(s) 202, one or more memory(ies) 204, a communication unit 206, one or more sensors 120, one or more input and/or output devices 210, and one or more data stores 212. The components of the computing device 200 are communicatively coupled by a bus 208. In embodiments where the computing device 200 represents the server 102, it may include an instance of the familiarity application 104, the familiarity graph database 106, and the navigation database 108. In embodiments where the computing device 200 represents the moving platform 118 or the client device 124, the computing device 200 may include instances of the user assistance application 122 and the familiarity application 104. It should be understood that these embodiment are merely examples and that other configurations are also possible and contemplated as discussed elsewhere herein. Further, the computing device 200 depicted in FIG. 2A is provided by way of example and it should be understood that it may take other forms and include additional or fewer components without departing from the scope of the present disclosure. For example, while not shown, the computing device 200 may include various operating systems, software, hardware components, and other physical configurations.

In embodiments where the computing device 200 is included or incorporated in the moving platform 118, the computing device 200 may include and/or be coupled to various platform components of the moving platform 118, such as a platform bus (e.g., CAN), one or more sensors (e.g., one or more control units (e.g., ECU, ECM, PCM, etc.), automotive sensors, acoustic sensors, chemical sensors, biometric sensors, positional sensors (e.g., GPS, compass, accelerometer, gyroscope, etc.), switches, and controllers, cameras, etc.) an engine, drive train, suspension components, instrumentation, climate control, and/or any other electrical, mechanical, structural, and mechanical components that are necessary.

The processor(s) 202 may execute software instructions by performing various input/output, logical, and/or mathematical operations. The processor(s) 202 may have various computing architectures to process data signals including, for example, a complex instruction set computer (CISC) architecture, a reduced instruction set computer (RISC) architecture, and/or an architecture implementing a combination of instruction sets. The processor(s) 202 may be physical and/or virtual, and may include a single core or plurality of processing units and/or cores. In some embodiments, the processor(s) 202 may be capable of generating and providing electronic display signals to a display device (not shown), supporting the display of images, capturing and transmitting images, performing complex tasks including various types of feature extraction and sampling, etc. In some embodiments, the processor(s) 202 may be coupled to the memory(ies) 204 via the bus 208 to access data and instructions therefrom and store data therein. The bus 208 may couple the processor(s) 202 to the other components of the computing device 200 including, for example, the memory(ies) 204, the communication unit 206, the sensor(s) 120, the input/output device(s) 210, and/or and the data store(s) 212.

The memory(ies) 204 may store and provide data access to the other components of the computing device 200. In some embodiments, the memory(ies) 204 may store instructions and/or data that may be executed by the processor(s) 202. For example, depending on the computing device 200 configuration, the memory(ies) 204 may store one or more of one or more the application(s) 104 and/or 122. The memory(ies) 204 are also capable of storing other instructions and data, including, for example, the various data described herein, an operating system, hardware drivers, other software applications, databases, etc. The memory(ies) 204 may be coupled to the bus 208 for communication with the processor(s) 202 and the other components of computing device 200.

The memory(ies) 204 include a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 202. In some embodiments, the memory(ies) 204 may include one or more of volatile memory and non-volatile memory. For example, the memory(ies) 204 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 204 may be a single device or may include multiple types of devices and configurations.

The communication unit 206 transmits data to and receives data from other computing devices to which it is communicatively coupled (e.g., via the network 112) using wireless and/or wired connections. The communication unit 206 may include one or more wired interfaces and/or wireless transceivers for sending and receiving data. The communication unit 206 may couple to the network 112 and communicate with other computing nodes, such as client device(s) 124, moving platform(s) 118 and/or server(s) 102, etc. (depending on the configuration). The communication unit 206 may exchange data with other computing nodes using standard communication methods, such as those discussed above.

The data store(s) 212 include a non-transitory storage medium that stores data. Non-limiting example non-transitory storage medium may include a dynamic random access memory (DRAM) device, a static random access memory (SRAM) device, flash memory, a hard disk drive, a floppy disk drive, a disk-based memory device (e.g., CD, DVD, Blu-ray™, etc.), a flash memory device, or some other known, tangible, volatile or non-volatile storage device. Depending on the computing device reflected by FIG. 2A, the data store(s) may represent one or more of the familiarity graph database 106 and/or the navigation database 108.

The data store(s) 212 may be included in the computing device 200 or in another computing device and/or storage system distinct from but coupled to or accessible by the computing device 200. In some embodiments, the data store(s) 212 may store data in association with a database management system (DBMS) operable by the server 102, the moving platform 118 and/or the client device 124. For example, the DBMS could include a structured query language (SQL) DBMS, a NoSQL DMBS, etc. In some instances, the DBMS may store data in multi-dimensional tables comprised of rows and columns, and manipulate, i.e., insert, query, update and/or delete, rows of data using programmatic operations.

Input/output (I/O) devices 210 include any standard devices for inputting and/or outputting information. Non-limiting example IO devices 210 may include a screen (e.g., LED-based display) for displaying road scene information to the user 128; an audio reproduction device (e.g., speaker) for outputting sound information to the user 128; a microphone for capturing sound and/or voice commands, a keyboard, a touch screen, a pointing device, indicators, and/and any other I/O components for facilitating communication and/or interaction with the user 128. Input/output devices 210 can be coupled to the computing device 200 either directly or through intervening I/O controllers.

The familiarity application 104 is computer logic executable to determine the familiarity of users with various road scenes. In some embodiments, the familiarity application 104 may receive road scene data (e.g., road scene images from the sensors 120 and/or the data store 212), and process the road scene data to extract various types of scene information at macro-scene level and at micro-scene level. The familiarity application 104 may be coupled to the data store(s) 212 to the data it needs to determine the familiarity of users with the various road scenes. As discussed in further detail below, the familiarity application 104 may use road scene data, familiarity graph data, historical navigation data, user data, sensor data, CAN data, and/or other data types to determine familiarity. In a further example, the familiarity application 104 may be coupled to the familiarity graph database 106 to store, retrieve, and/or otherwise manipulate familiarity graph data, may be coupled to the navigation database to retrieve historical navigation data, may be coupled to the sensor(s) (e.g., via the bus 208 and/or various controllers) to receive sensor data, may be coupled to other components, such as the user assistance application 122 to provide and/or receive data, etc.

The user assistance application 122 is a computer logic executable to receive the familiarity index of the user from the familiarity application 104 (e.g., via the bus 208 and/or various controllers) and to provide user assistance (e.g., driving guidance) to the user via input/output devices 210.

Figure 2B:
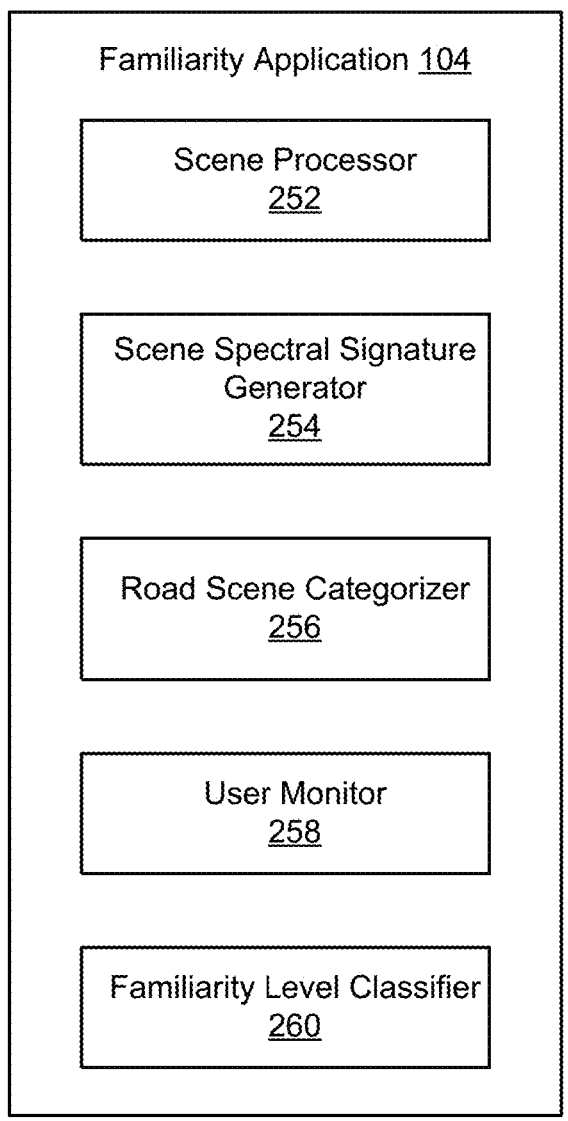
FIG. 2B is a block diagram of an example familiarity application.

FIG. 2B is a block diagram of an example familiarity application 104. As depicted, the familiarity application 104 may include a scene processor 252, a scene spectral signature generator 254, a road scene categorizer 256, a user monitor 258, and a familiarity level classifier 260, although it should be understood that the familiarity application 104 may include additional components such as, but not limited to, a configuration engine, other training engines, an encryption engine, etc., and/or these various components may be combined into a single engine or divided into additional engines.

The scene processor 252, the scene spectral signature generator 254, the road scene categorizer 256, the user monitor 258, and the familiarity level classifier 260 may be implemented as software, hardware, or a combination of the foregoing. In some embodiments, the scene processor 252, the scene spectral signature generator 254, the road scene categorizer 256, the user monitor 258, and the familiarity level classifier 260 may be communicatively coupled by the bus 208 and/or the processor 202 to one another and/or the other components of the computing device 200. In some embodiments, one or more of the components 104, 252, 254, 256, 258 and/or 260 are sets of instructions executable by the processor 202 to provide their functionality. In further embodiments, one or more of the components 104, 252, 254, 256, 258 and/or 260 are storable in the memory 204 and are accessible and executable by the processor 202 to provide their functionality. In any of the foregoing embodiments, these components 104, 252, 254, 256, 258 and/or 260 may be adapted for cooperation and communication with the processor 202 and other components of the computing device 200.

The familiarity application 104, and its components 252, 254, 256, 258, and 260 are described in further detail below with reference to at least FIGS. 3-7.

Figure 3:
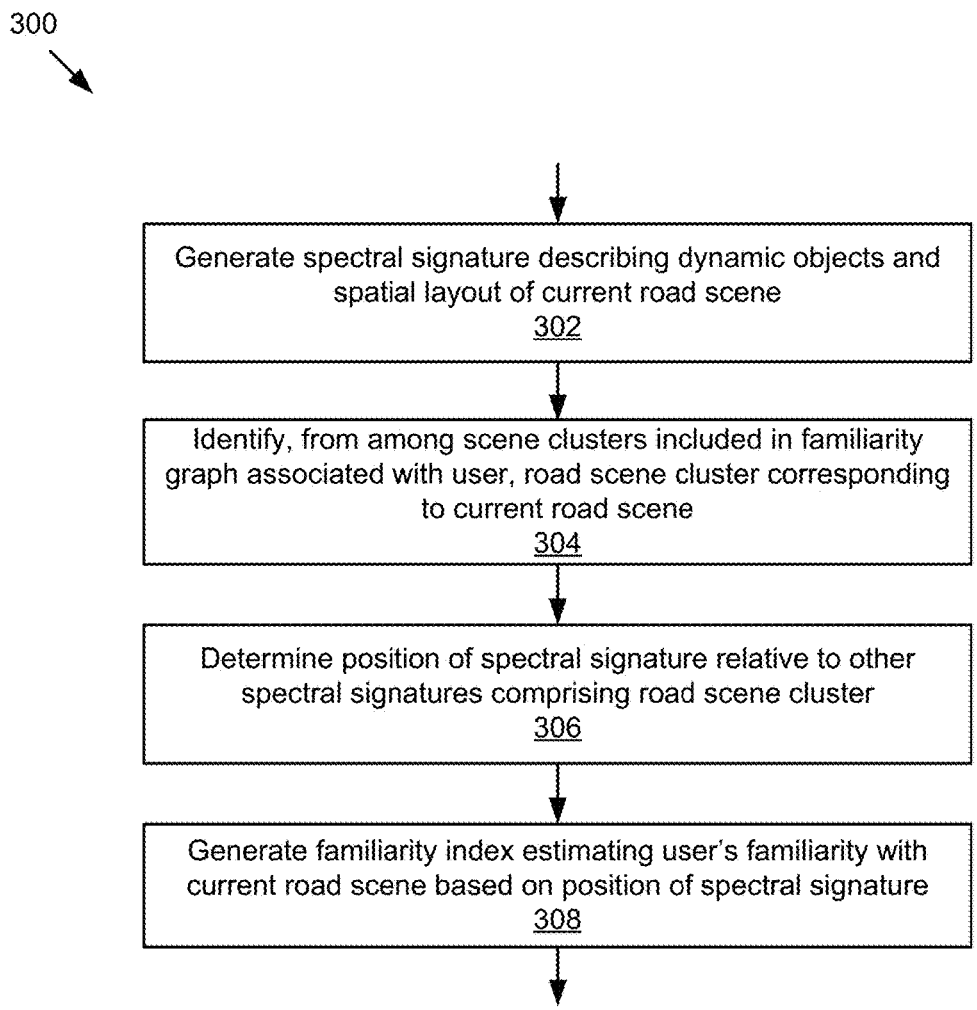
FIG. 3 is a flowchart of an example method for generating a familiarity index estimating familiarity of a user to a current road scene.

FIG. 3 is a flowchart of an example method 300 for determining user familiarity with a road scene. In block 302, the scene spectral signature generator 254 is executable (e.g., programs the processor(s) 202) to generate a spectral signature describing the current road scene from the scene information. In some embodiments, the current road scene may be the road scene currently in front of the moving platform 118 of the user, which is captured by one or more sensors 120 (e.g., roadway sensors 702). In some embodiments, the scene information may include one or more road scene aspects extracted from the sensor data and describing the current road scene. The spectral signature is a description of the current road scene. In some embodiments, the spectral signature may summarize the scene information in a condensed representation, as discussed elsewhere herein.

Figure 4A:
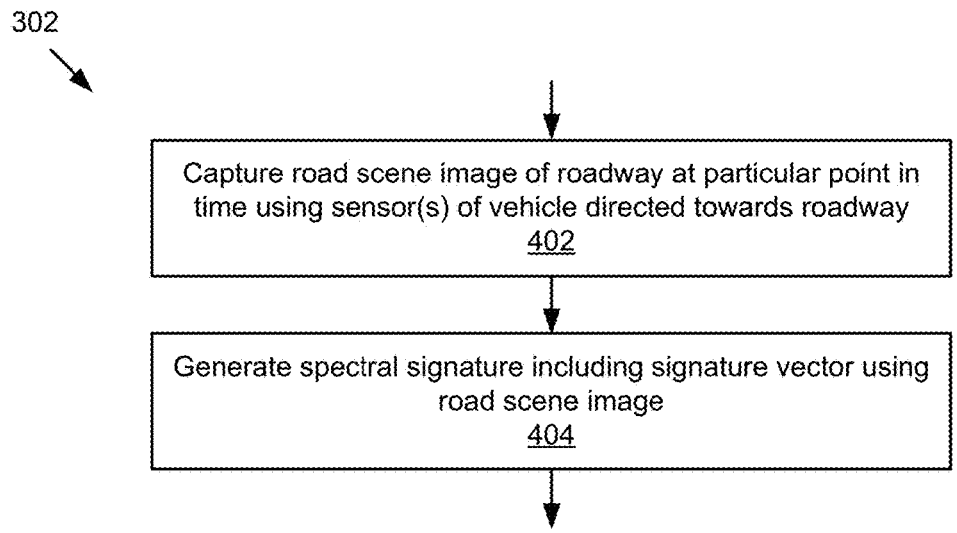
FIG. 4A is a flowchart of an example method for generating a spectral signature describing a current road scene.

FIG. 4A is a flowchart of an example method 302 for generating the spectral signature describing the current road scene depicted in the road scene image.

In block 402, the roadway sensors 702 may capture road scene image of the roadway at particular point in time. In particular, the roadway sensors 702 directed towards the roadway may be installed in the moving platform 118 to capture road scene data describing an environment surrounding the moving platform 118. For example, the roadway sensors 702 may capture image data. The image data may include road scene images captured at a certain rate/interval (e.g., every 0.5 s, 1 s, 3 s, etc.) as the moving platform 118 travels along the road. In some embodiments, the capturing interval may vary depending on scene-level context and/or complexity of the road scene. For example, the roadway sensors 702 may capture the outside scene more frequently (e.g., every 0.2 s) when the road segment has a complicated road structure or when a number of dynamic objects detected in the scene exceeds a threshold value. In further embodiments, the capture rate/interval may be a standard frame rate, variable frame rate, etc.

In block 404, the scene spectral signature generator 254 may generate a spectral signature using the road scene image. In some embodiments, the special signature may include a signature vector, although other data representations are also possible and contemplated. In particular, the scene processor 252 may process the road scene image captured by the roadway sensors 702 to extract the scene information and the scene spectral signature generator 254 may compute a spectral signature of the current road scene from the extracted scene information.

In some embodiments, the scene processor 252 is executable (e.g., programs the processor(s) 202) to determine scene information using sensor data. For example, the scene processor 252 may be communicatively coupled to the sensors 120 (e.g., via the bus 208 and/or the processor(s) 202) and/or the data store 212 to receive sensor data, and may process the sensor data to extract the scene information. As a further non-limiting example, the scene processor 252 may receive image data from one or more light and/or radar sensors (e.g., one or more cameras), and process the image data to extract various road scene aspects associated with a particular road segment.

In some embodiments, the scene processor 252 may extract the scene information including one or more road scene aspects from the road scene data (e.g., road scene images captured by the roadway sensors 702) using windowing algorithm. In particular, the scene processor 252 may slide detection windows of different sizes across the road scene image to capture gradient, texture information, and to identify one or more objects appearing in the scene. For example, the scene processor 252 may detect from the image various items e.g., sky, horizon, roadway, roadside structure, buildings, vehicles, pedestrians, traffic controls, etc. In some embodiments, the scene processor 252 may also determine from the image various road scene aspects that describe the current outside situation at micro level of scene complexity.

For example, the scene processor 252 may analyze holistic spatial information and spatial envelop properties of the given road scene to determine scene compositions (e.g., dynamic objects, static objects), object type of the detected objects (e.g., construction vehicles, road workers, police officers, lane boundaries, barricades, traffic signs), number of items associated with each object type (population of pedestrians, a count of traffic cones), relative position and/or spatial distribution of the detected objects within the scene (e.g., lane position of other moving platforms 118, relative distance between traffic cones, surrounding vehicle layout), etc. In some embodiments, the scene processor 252 may also determine other road scene aspects of the dynamic outside situation such as weather condition (e.g., sunny, partially cloudy, raining heavily), lighting condition (e.g., bright, low, normal), scene-level context (e.g., light, moderate, heavy traffic, etc.), area of the road on which the moving platform 118 is travelling (e.g., lane number such as lane 3, lane type such as passing lane), drivable lane width (e.g., two-third of the original lane width), number of open lanes, etc. based on the image data. Other techniques for scene analysis and object detection, e.g. GIST image descriptor, Bag of Word (BoW) model, Local Binary Pattern (LBP) model and/or other vision algorithms, etc., are also applicable and contemplated.

In some embodiments, the scene spectral signature generator 254 may generate a spectral signature for the current road scene based on the micro-scene information that the scene processor 252 extracted from the captured scene image. In particular, the scene spectral signature generator 254 may combine various road scene features and road scene aspects into a spectral signature describing the outside scene. In some embodiments, the spectral signature may be a condensed description of the road scene situation in front of the user at micro-scene level of complexity. For example, the spectral signature may describe the scene composition and scene layout of the current road scene. In some embodiments, the scene composition may indicate what dynamic objects appear in the scene, object type of these detected dynamic objects, number of items of each object type, etc. In some embodiments, the spatial localized information of the road scene may represent the scene layout. For example, the scene layout may describe a relative position, relative distance and/or spatial distribution of the detected dynamic objects within the scene. In some embodiments, the spectral signature may also include other road scene aspects (e.g., drivable lane width, number of open lanes, congestion information of each lane due to vehicle/pedestrian traffic, etc.), as discussed elsewhere herein.

In some embodiments, the spectral signature may conform to a predetermined structure to effectively describe different road scenes in a consistent format of representation. For example, the scene spectral signature generator 254 may compute the spectral signature for the current road scene in the form of a signature vector. In some embodiments, the signature vector (also referred to as signature index) may be a multidimensional vector containing multiple numerical values, each value describes a road scene attribute or a road scene aspect. Other types of multidimensional vectors (e.g., binary vector, character vector, vector of logical values, etc.) are also possible and contemplated. In this present disclosure, because the spectral signature may be generated in the form of a signature vector, and the spectral signature may be interchangeably referred to as the signature vector and/or the signature index.

For example, as illustrated in FIG. 8, the scene spectral signature generator 254 may generate a signature vector $v_4$ of [100, 5, 2, 125, 5, 4, 150, 1, 20, 1] to describe the road scene at the time t=t4 on day 4. In this example, the first three values (100, 5, 2) of the signature vector indicate that there is construction cone(s) present in the scene and five of them are placed about two feet apart. The next three values (125, 5, 4) may indicate that the road scene includes road worker(s) and five of them are spread out in the work zone at a distance of about four feet. The last four values (150, 1, 20, 1) may indicate that construction vehicle(s) are present in the scene. For instance, the position of the construction vehicle is twenty feet away from a point of reference and the construction vehicle is in operation in the work zone.

As a further example, still referring to FIG. 8, the road scene at the time t=t3 on day 3 can be described by a signature vector $v_3$ of [100, 5, 2, 125, 2, 8, 150, 0, 0, 0]. In this example, the first three values of the signature vector (100, 5, 2) indicate that construction cone(s) are detected in the scene and five of them are placed about 2 feet apart. The next three values (125, 2, 8) indicate that the road scene includes two road workers and they are working eight feet away from each other. The last four values (150, 0, 0, 0) indicate that there is no construction vehicle presented in the scene, the two respective values representing relative position within the scene and operation status of construction vehicle(s) are thus determined to be zero.

As a further example, the road scene at the time t=t2 on day 3 depicted in FIG. 8 can be described by a signature vector $v_2$ of [100, 5, 2, 125, 0, 0, 150, 0, 0, 0]. In this example, the first three values of the signature vector (100, 5, 2) indicate that construction cone(s) are detected in the scene and five of them are placed about 2 feet apart. The next three values (125, 0, 0) indicate that the road scene does not include a road worker and the last four values (150, 0, 0, 0) indicate that the road scene does not include a road construction vehicle. In this example, other vector values describing other road scene aspects described elsewhere herein can be indexed in the signature vector to generate a comprehensive representation of the outside situation currently in front of the user.

Referring back to FIG. 3, in block 304, the familiarity level classifier 260 is executable (e.g., programs the processor(s) 202) to identify, from among scene clusters included in a familiarity graph associated with the user, a road scene cluster corresponding to the current road scene. The familiarity level classifier 260 may identify the road scene cluster of the current road scene based on the macro-scene category to which the current road scene belongs. The familiarity level classifier 260 may retrieve the macro scene category from storage and/or receive it from the road scene categorizer 256, and then use the macro scene category to identify the road scene cluster in the familiarity graph. In some embodiments, road scene categorizer 256 may use standard scene processing algorithms to process and classify the road scene into a macro scene category. In further embodiments, the road scene categorizer 256 may use the spectral signature to classify the road scene into a macro scene category.

Figure 4B:
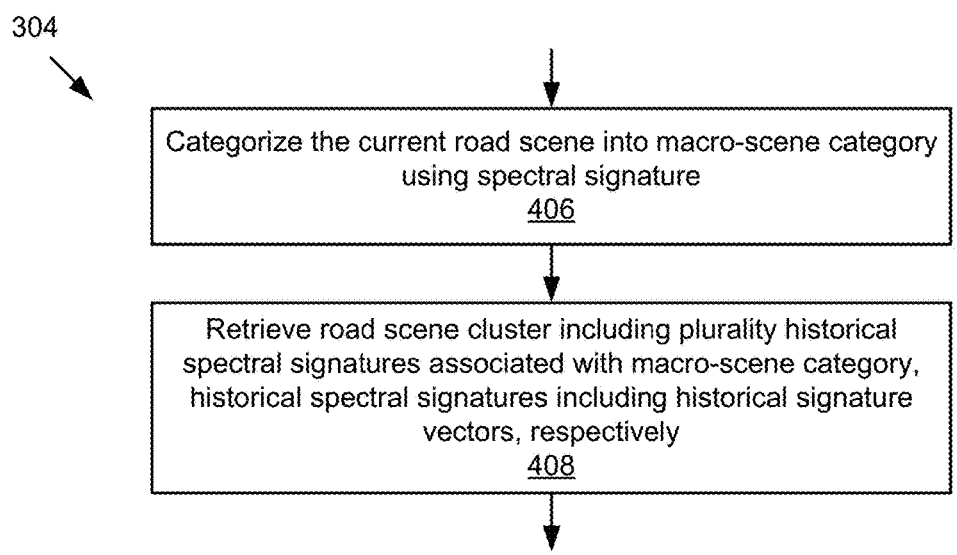
FIG. 4B is a flowchart of an example method for identifying a road scene cluster corresponding to a current road scene in a familiarity graph.

FIG. 4B is a flowchart of an example method 304 for determining the current road scene and identifying a road scene cluster corresponding to the current road scene. In block 406, the road scene categorizer 256 is executable (e.g., programs the processor(s) 202) to categorize the current road scene into a macro-scene category (e.g., type of location). Example macro-scene categories include, but are not limited to, an urban category, a rural category, a residential category, a construction zone category, a highway category, an accident category, etc.

In some embodiments, the road scene categorizer 256 may classify the current road scene into one or more macro-scene category(ies) (e.g., type of location) along with corresponding probabilities, and then select the macro-scene category with the highest probability. Then, as the road scene categorizer 256 receives feedback about the accuracy of the classification, the road scene categorizer 256 may learn by revising one or more variables used to determine the category for future iterations.

In some embodiments, the road scene categorizer 256 may classify a road scene situation into different semantic categories depending on what is detected in the road scene (e.g., as reflected by the micro-scene information). For instance, as discussed elsewhere herein, the road scene categorizer 256 may categorize the road scene using the micro scene information, such as that included in the spectral signature, although other suitable variations are also possible and contemplated. For example, as depicted in the example day 1 of FIG. 8, if the spectral signature describes the road scene as including high buildings, crowded streets and busy crosswalks (e.g., the values of signature index indicate small relative distances between pedestrians and between vehicles), the road scene categorizer 256 may identify the macro-scene category of the current road scene as "urban" scene based on these characteristics by comparing them to pre-stored characteristics associated with known road scene categories.

In further example, as illustrated in the examples day 3 and day 4 of FIG. 8, if the spectral signature includes data describing a roadway environment as having traffic cones, road workers and/or construction vehicles, the road scene categorizer 256 may identify the macro-scene category of the current road scene as "construction zone" scene based on these characteristics. As another example, the spectral signature includes data describing a roadway environment having ambulances, police officers and damaged vehicles, the road scene categorizer 256 may classify the current road scene into a road scene category of "accident" based on these characteristics.

The macro-scene category may comprise macro-scene information because it can coarsely describes the current road scene at macro level of scene complexity, while the micro-scene information includes specific details about the road scene, as discussed elsewhere herein. As a further example, the spectral signature may include, as micro-scene information, specific details related to the current road scene. In some instances, the signature vector represents a compact and comprehensive description of the road scene the user needs to handle at the present time. In some embodiments, the road scene categorizer 256 may update the signature vector to incorporate the macro-scene category into the signature vector describing the current road scene. In some embodiments, the macro-scene information (e.g., the macro-scene category) and the micro-scene information (e.g., the spectral signature) may be provided separately to the familiarity level classifier 260 to determine the familiarity of the user to the road scene situation ahead.

Figure 9:
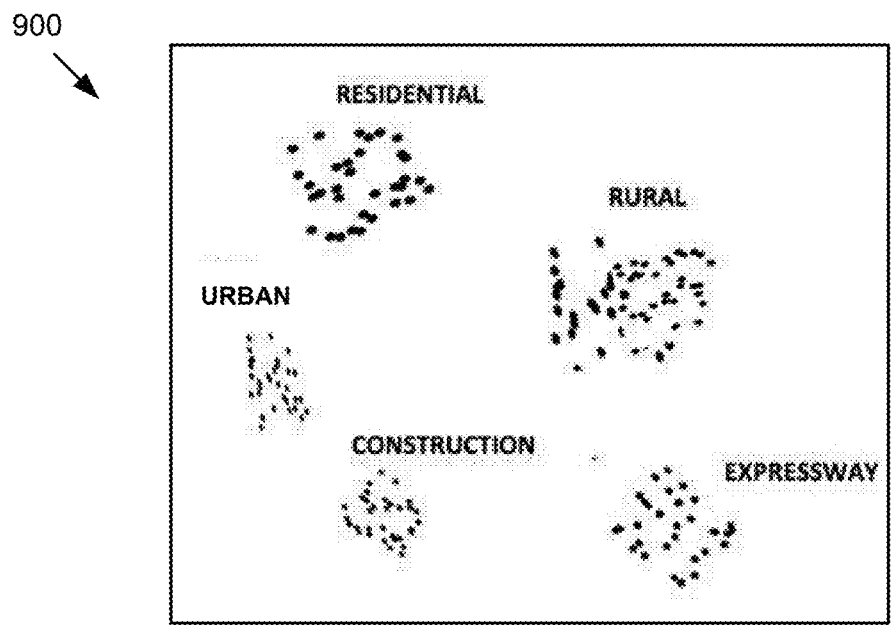
FIG. 9 depicts examples of road scene clusters in a familiarity graph.

In some embodiments, the familiarity level classifier 260 may be coupled to the familiarity graph database 106 to retrieve a familiarity graph associated with the user of the moving platform 118. An example familiarity graph associated with a user is depicted in FIG. 9. The familiarity graph may include a history of the different road scenes the user has experienced. The graph may associate the different instances based on attributes that those instances have in common. For example, the different construction zones driven through by the user may be associated based on the common attribute of "construction." Further examples are discussed elsewhere herein.

In some embodiments, the familiarity graph of the user may include historical spectral signatures describing the historical road scenes the user has experienced. In particular, the historical spectral signature may describe the road scene situation the user has encountered in the past at micro-scene level, while the spectral signature describes the road scene situation currently ahead of the user at micro-scene level. The familiarity graph of the user may be an aggregated collection of spectral signatures that the scene spectral signature generator 254 has generated for previous driving instances in the user's driving history. As a result, similar to the spectral signature, each historical spectral signature may also be represented by a historical signature vector (also referred to as historical signature index) and the historical signature vector may also be a multidimensional vector containing multiple values (e.g., numerical value, binary value, character value, logical value, etc., and/or any combination thereof). The values included in the historical signature vectors may describe road scene attributes, various road scene aspects, etc., of the corresponding historical road scenes that the user has experienced.

In some embodiments, the spectral signature describing the current road scene may mature into a historical spectral signature describing a historical road scene as the driving history of the user grows. For example, referring to multiple road scene situations depicted in FIG. 8, when determining the real-time familiarity index of the user to the road scene situation at the time t=t4 on day 4, the vector $v_4$ describing the road scene in front of the user at the time t=t4 (e.g., [100, 5, 2, 125, 5, 4, 150, 1, 20, 1]) is considered the spectral signature of the current road scene, while the vector $v_3$ describing the road scene situation in front of the user at the time t=t3 on day 3 (e.g., [100, 5, 2, 125, 2, 8, 150, 0, 0, 0]) is considered a historical spectral signature of a historical road scene. These two signature vectors are included in the familiarity graph and become historical spectral signatures when the scene spectral signature generator 254 generates a new spectral signature for a current road scene situation at a subsequent point in time. Advantageously, the familiarity graph of the user may be updated to include a spectral signature corresponding to the current road scene, as described in further detail below, and as a result, the familiarity graph of the user can capture every road scene situations the user encounters. This allows the graph to automatically develop over time as the user continues driving on day-to-day basis.

In some embodiments, the proximity between spectral signatures (also referred to as spectral signature data points)

included in the familiarity graph may reflect their similarity in scene context at the macro level and/or micro level. In particular, at the micro-scene level, a relative distance between two historical spectral signatures and/or one or more values in those spectral signatures, in the familiarity graph may indicate how closely related the road scenes corresponding to the signatures are (e.g., in terms of scene composition, scene layout, etc., as represented by values of the signatures). As an example, at macro-scene level, historical spectral signatures belonging to the same macro-scene category may cluster together. Further, within that cluster, various spectral signatures having attributes in common (at the micro-scene level) may form further data clusters that may be queried/retrieved, as discussed further elsewhere herein.

For example, the historical spectral signatures of the road scene situations at the time t=t2, t=t3, and t=t4 depicted in FIG. 8 both describe road scenes having construction cones and/or road workers and/or construction vehicle distributed in generally similar spatial layouts. The historical spectral signatures representing these road scenes situations (e.g., signature vector $v_2$, $v_3$, and $v_4$) are therefore proximate to each other in the familiarity graph and may be grouped together to form a cluster corresponding to their common macro-scene category of "construction zone," e.g., cluster of "construction," as illustrated in FIG. 9. In contrast, the historical spectral signature of the road scene situation at the time t=t1 depicted in FIG. 8 may describe an urban scene with a clear roadway. The vector values of this historical spectral signature are substantially different from vector values of historical spectral signatures describing road scenes at the time t=t2, t=t3, and t=t4, because it does not describe construction cones, road workers and/or other road scene aspects of a construction zone scene. As a result, the location of the historical spectral signature of the road scene captured at the time t=t1 is remote from the locations of these three historical spectral signatures within the familiarity graph, and is not included in the road scene cluster of "construction" associated with these three spectral signatures. Instead, the location of the historical spectral signature of the road scene at the time t=t1 may be more proximate to various other historical spectral signatures describing road scenes categorized as "urban" due to their similarity in values of historical signature index, and may thus be grouped into a road scene cluster of "urban" as depicted in FIG. 9.

In some embodiments, the familiarity graph of the user may include multiple road scene clusters associated with respective macro-scene categories in the user's driving history. For example, as illustrated in FIG. 9, the familiarity graph of the user may include a residential scene cluster, a rural scene cluster, an expressway scene cluster, a construction scene cluster, and an urban scene cluster. Other examples of road scene clusters are possible and contemplated. In some embodiments, the familiarity graph may also include one or more isolated/scattered historical spectral signatures, which represent historical road scene situations that the user has not encountered very often. As the user continues driving, more similar road scene situations may occur and their spectral signatures may be updated to (e.g., inserted in) the user's familiarity graph. In some embodiments, once the number of historical spectral signatures clustered together satisfies a threshold value, a new scene cluster may be established for these signature data points. For example, the familiarity level classifier 260 may create a new road scene cluster for and comprising these isolated historical spectral signatures. In some embodiments, the familiarity level classifier 260 may use k-means clustering algorithm to group proximate spectral signature data points into road scene clusters. Other nearest neighbor algorithms are also possible and contemplated. In some embodiments, data points associated with different macro scenes may be included and associated in the same familiarity graph and/or segmented into different familiarity graphs.

Referring back to FIG. 4B, in block 408, the familiarity level classifier 260 is executable (e.g., programs the processor(s) 202) to identify a road scene cluster corresponding to the current road scene. In some embodiments, the road scene cluster may be selected from the familiarity graph associated with the user using the road scene category. In these or other embodiments, the road scene cluster may be selected using a density parameter indicating a data point density and/or a distance parameter specifying a distance threshold within which data points should reside. Other filters and/or selection parameters are also possible and contemplated.

Continuing the above example where the road scene categorizer 256 may classify the road scene currently ahead at the time t=t4 into the macro-scene category of "construction zone," the familiarity level classifier 260 may then determine the road scene cluster corresponding to the category of "construction zone" in the familiarity graph, e.g., the scene cluster "construction" as depicted in FIG. 9. As discussed elsewhere herein, in some embodiments, the road scene cluster "construction" may include multiple historical spectral signatures proximate to each other and clustered together based on their common macro-scene category of "construction zone." In these embodiments, the familiarity level classifier 260 can effectively identify a cluster of historical spectral signatures relevant to the road scene in front of the user at the time t=t4, for example, based on the macro-scene information (e.g., the macro-scene category) of that current road scene. This is particularly advantageous in case the user has been driving for a while and a considerable amount of his driving history has been collected. In this example, because only the related portion of the user's familiarity graph (e.g., cluster of similar macro scenes) is further utilized to compute the user's familiarity index, computational cost can thus be significantly reduced, although other variations are also possible and contemplated with computational efficiency is less of an issue and/or a larger data scope is desired.

Referring back to FIG. 3, in block 306, the familiarity level classifier 260 is executable (e.g., programs the processor(s) 202) to determine a position of the spectral signature relative to other spectral signatures comprising the road scene cluster identified in block 304. In some embodiments, the distance between spectral signatures may be determined based on the similarities and/or differences between the values included in the spectral signatures.

Figure 4C:
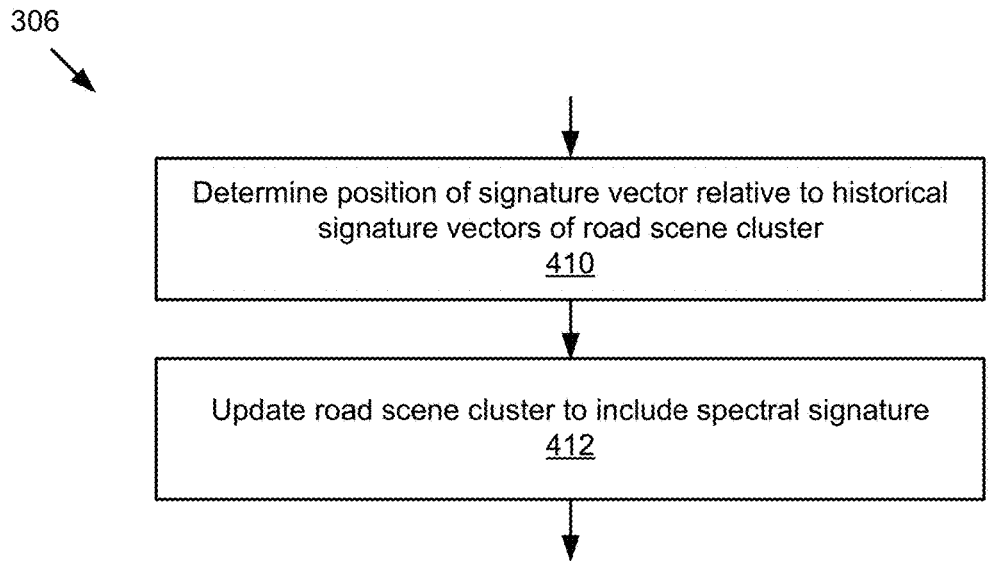
FIG. 4C is a flowchart of an example method for determining a position of a spectral signature relative to other spectral signatures comprising a road scene cluster.

In some embodiments, the method 300 uses the operations discussed in FIG. 4C to determine position, although other suitable variations are also possible and contemplated. FIG. 4C in particular is a flowchart of an example method 306 for comparing the generated spectral signature describing the road scene currently ahead of the user with other historical spectral signatures comprising the identified road scene cluster to determine a relative position of the spectral signature in the user's familiarity graph.

In block 410, the familiarity level classifier 260 is executable (e.g., programs the processor(s) 202) to determine a position of the signature vector relative to historical signature vectors of the identified road scene cluster. In some embodiments, the familiarity level classifier 260 may determine the position of the signature vector by matching its vector values against the vector values of historical signature vectors comprising the identified cluster. As discussed elsewhere herein, at the micro level of scene complexity, the proximity between spectral signature data points in the familiarity graph may indicate their similarity in terms of scene composition and scene layout, which are indicated by vector values of the corresponding spectral signatures.

Continuing the above example, the road scene scenario occurring at the time t=t4 as depicted in FIG. 8 may be categorized as construction zone scene and the road scene cluster "construction" corresponding to this macro-scene category in the familiarity graph may be retrieved. The familiarity level classifier 260 may then match the spectral signature describing the current road scene at the time t=t4 (e.g., signature vector $v_4$ of [100, 5, 2, 125, 5, 4, 150, 1, 20, 1]) against historical spectral signatures that form the road scene cluster "construction," for example, the spectral signature describing a historical road scene at the time t=t3 (e.g., signature vector $v_3$ of [100, 5, 2, 125, 2, 8, 150, 0, 0, 0]) and the spectral signature describing a historical road scene at the time t=t2 (e.g., signature vector $v_2$ of [100, 5, 2, 125, 0, 0, 150, 0, 0, 0]). For example, the familiarity level classifier 260 may compute the distance between signature vector $v_4$ and signature vector $v_3$, the distance between signature vector $v_4$ and signature vector $v_2$, and may compare these computed distances. The familiarity level classifier 260 may then determine that, within the road scene cluster "construction," the spectral signature of the road scene at the time t=t4 is positioned closer to the spectral signature of the road scene at the time t=t3 than the spectral signature of the road scene at the time t=t2 because the distance between signature vector $v_4$ and signature vector $v_3$ is smaller than the distance between signature vector $v_4$ and signature vector $v_2$. The determined proximity between these spectral signatures indicates the fact that the road scene situation at the time t=t4 is more similar to the road scene situation at the time t=t3 than the road scene situation at the time t=t2. For example, the road scenes at the time t=t4 and t=t3 both include road workers while the road scene at the time t=t2 does not.

In block 412, the familiarity level classifier 260 is executable (e.g., programs the processor(s) 202) to update the road scene cluster to include the spectral signature in the familiarity graph. In particular, the familiarity level classifier 260 may update the road scene cluster to include the spectral signature describing the current road scene ahead of the user at the position determined in block 410. Continuing the above example, the familiarity level classifier 260 may update the road scene cluster of "construction" in the familiarity graph depicted in FIG. 9 to include spectral signature $v_4$, e.g., based on its relative proximity to other spectral signatures already existing in the familiarity graph and comprising the cluster of "construction" (e.g., spectral signature $v_2$, spectral signature $v_3$, etc.). For example, the familiarity level classifier 260 may position the spectral signature $v_4$ closer to the spectral signature $v_3$ than the spectral signature $v_2$ within the road scene cluster of "construction." In some embodiments, the familiarity level classifier 260 may constantly update the familiarity graph of the user with spectral signatures describing various dynamic road scene situations that the user encounters over time. These spectral signatures can be automatically generated and advantageously localized within clusters of the familiarity graph, as described in detail above.

Referring back to FIG. 3, in block 308, the familiarity level classifier 260 is executable (e.g., programs the processor(s) 202) to generate a familiarity index estimating the familiarity of the user with the current road scene based on the position of the spectral signature describing the current road scene determined in block 304. The familiarity index (e.g., also referred to as real-time familiarity index, on-route familiarity index) may indicate the familiarity of the user to the road scene currently in front of the user. In some embodiments, In some embodiments, the familiarity level classifier 260 may apply one or more familiarity zones associated with the road scene cluster to which the spectral signature belongs to generate the familiarity index.

Figure 4D:
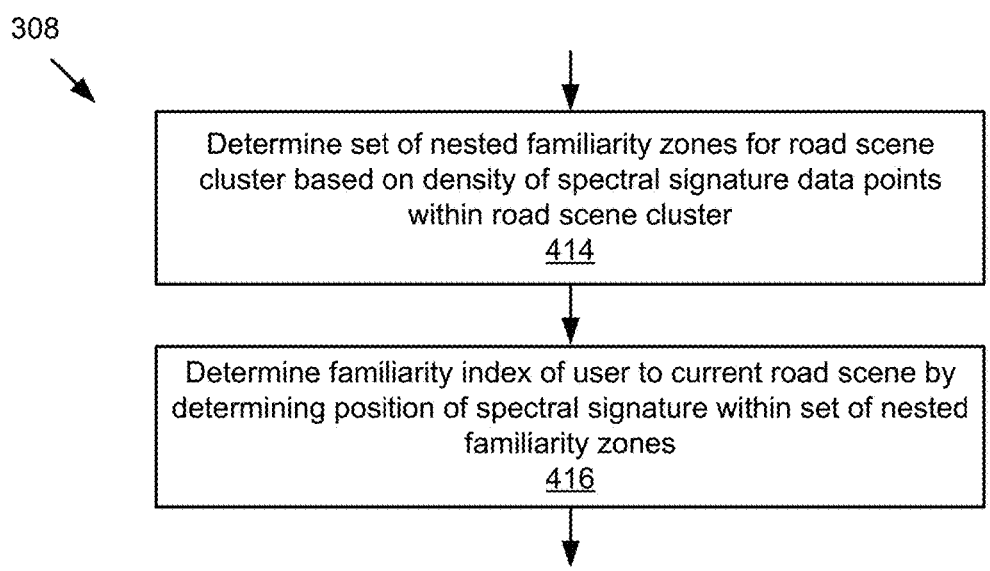
FIG. 4D is a flowchart of an example method for determining a familiarity index of a user to a current road scene.

FIG. 4D is a flowchart of an example method 308 for generating the familiarity index of the user to the current road scene, although it should be understood that other suitable method are also possible and contemplated. In block 414, the familiarity level classifier 260 is executable (e.g., programs the processor(s) 202) to determine a set of nested familiarity zones for road scene clusters in the familiarity graph based on a density of spectral signature data points within the clusters. As described elsewhere herein, each spectral signature in the familiarity graph represents a historical road scene the user has previously encountered in the past. As a result, the distribution pattern of these spectral signatures in the familiarity graph may indicate how familiar the user is with these historical road scene situations. For example, a substantive number of historical spectral signatures clustered tightly together may indicate that the user has encountered similar road scenes multiple times and may therefore likely be familiar if a similar road scene situation occurs. In contrast, an isolated spectral signature data point may correspond to a road scene situation that has not happened a lot in the user's driving history. As a result, a road scene situation with similar spectral signature likely remains unfamiliar to the user and the user therefore may need more guidance. This may advantageously result in the user receiving different information than if the user was familiarity with the roadway.

Figure 10:
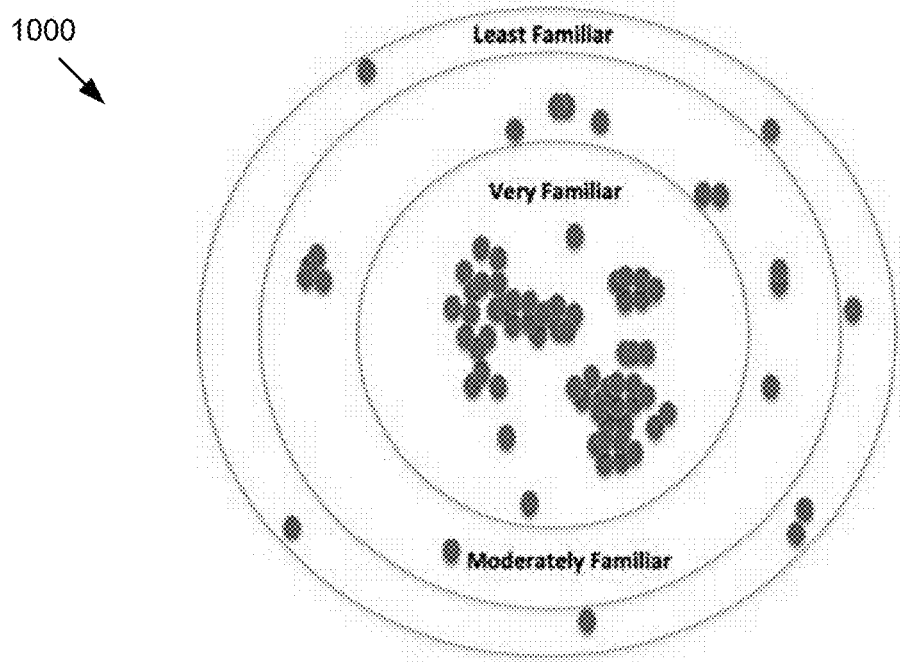
FIG. 10 illustrates an example density distribution of spectral signature data points and example familiarity zones within a road scene cluster (in top view).

In some embodiments, the familiarity level classifier 260 may determine one or more familiarity zones associated with a scene cluster by determining which area(s) of the cluster has sub-cluster(s) satisfying certain density thresholds. In particular, the familiarity level classifier 260 may compare the density of signature data points of various areas within the road scene cluster against one or more threshold values to classify these areas as having high density, average (moderate) density, or low density of signature data points. The familiarity level classifier 260 may then identify these areas of the road scene cluster as familiarity zones of "very familiar," "moderately familiar," and "least familiar," respectively. In some embodiments, these familiarity zones may form a nested structure covering the cluster because they may partially overlap, include, or exclude each other. FIG. 10 illustrates an example density distribution of spectral signature data points and example familiarity zones associated with the road scene cluster "construction" from the familiarity graph depicted in FIG. 9. As shown, the road scene cluster "construction" may have a set of three nested familiarity zones in the form of three concentric circles representing three different thresholds, although it should be understood that the threshold may have any suitable form or shape, may intersect, may be non-uniform, have any non-geometric shape or geometric shape (e.g., ellipse, triangle, rectangular, etc.), etc.

In block 416, the familiarity level classifier 260 is executable (e.g., programs the processor(s) 202) to determine the familiarity index of the user reflecting an estimation of the user's familiarity with the current road scene. In some embodiments, the familiarity level classifier 260 may determine the familiarity index by determining the position of the spectral signature describing the current road scene within the nested familiarity zones. For instance, the familiarity level classifier 260 may compare the position of the spectral signature describing the current road scene against the nested familiarity zones of the scene cluster corresponding to the current road scene, as discussed elsewhere herein.

Continuing the previous example, when determining the familiarity index of the user to the current road scene at the time t=t4, the familiarity level classifier 260 may determine the position of the spectral signature describing the current road scene at the time t=t4 (e.g., signature vector $v_4$) relative to the three familiarity zones of the road scene cluster "construction" as illustrated in FIG. 10. If this spectral signature locates within the innermost familiarity zone of "very familiar," the familiarity level classifier 260 may determine the familiarity index of the user to the current road scene situation as "very familiar." If this spectral signature lies outside of the innermost familiarity zone of "very familiar" but inside the middle familiarity zone of "moderately familiar," the familiarity level classifier 260 may classify the familiarity of the user to the current road scene as "moderately familiar." If this spectral signature falls outside of the middle familiarity zone of "moderately familiar" but within the outermost familiarity zone of "least familiar," the familiarity level classifier 260 may categorize the familiarity index of the user as "least familiar" or "unfamiliar."

In some embodiments, the familiarity level classifier 260 may generate the familiarity index of the user to the current road scene in the form of a familiarity metric, e.g., a familiarity score. In some embodiments, the familiarity score may be a quantified (e.g., numerical) value estimating the user's familiarity, for example, a percentage of familiarity. In some embodiments, the familiarity level classifier 260 may determine the distance from the spectral signature to a point of reference and may compute an estimated percentage of familiarity of the user to the current road scene based on the determined distance. As a non-limiting example, with reference to the distribution of spectral signatures depicted in FIG. 10, the familiarity level classifier 260 may calculate the distance from the signature vector $v_4$ to the center point of the three concentric familiarity zones (point of reference) and estimate the percentage of familiarity inversely proportional to the calculated distance. For example, if the distance from the spectral signature data point $v_4$ to the center point is 1.50, the user may be 95% familiar with the road scene situation occurring at the time t=t4. If the distance from the spectral signature data point $v_4$ to the center point is 5.23, the user may be 33% familiar with this road scene situation. In this example, the familiarity level classifier 260 may further classify the percentage of familiarity within the range of, for example, [0%, 33%) as "unfamiliar", [33%, 70%] as "moderately familiar" or "fairly familiar," and (70% to 100%] as "very familiar."

Figure 6:
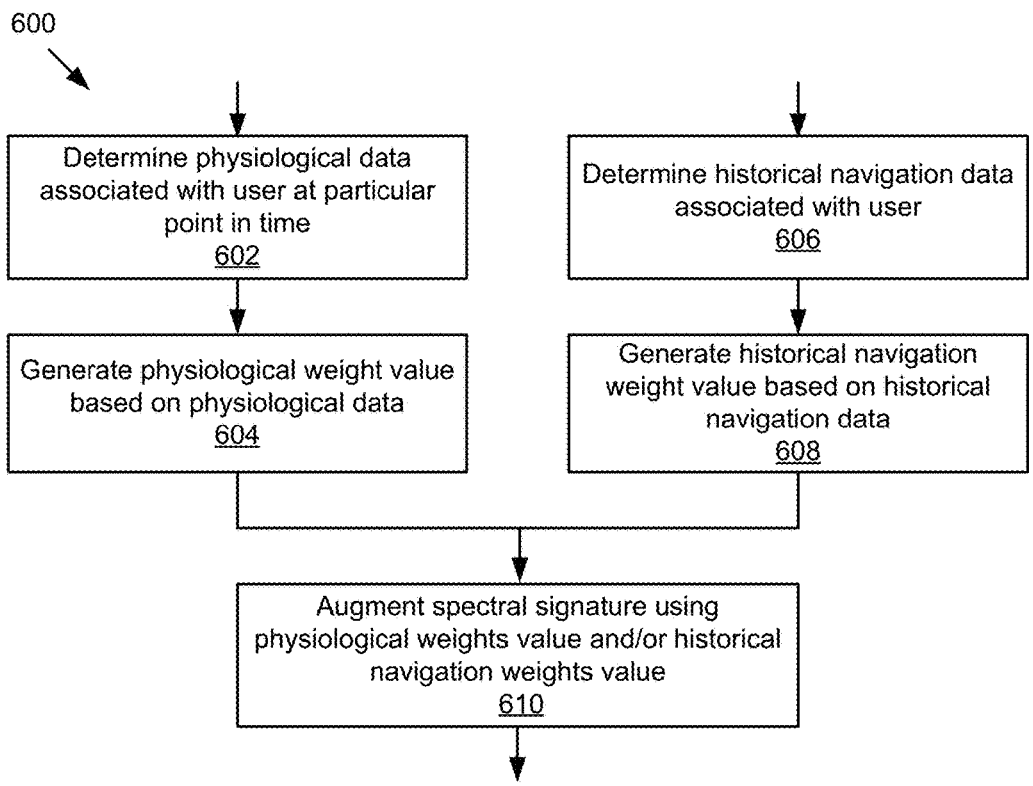
FIG. 6 is a flowchart of an example method for augmenting a spectral signature.

FIG. 6 is a flowchart of an example method 600 for augmenting a spectral signature. In some embodiments, the familiarity level classifier 260 may use physiological data of the user captured in real-time (includes time delay due to delay caused by gathering, processing, and/or transmitting data) when the user is driving on the roadway and historical navigation data of the user to augment the spectral signature computed based on the road scene image (which is discussed in detail with reference to at least FIGS. 3-4D). In particular, as illustrated in FIG. 7, the familiarity level classifier 260 may receive physiological data from the physiological sensor(s) 704 and the facial sensor(s) 706, may retrieve the historical navigation data from the navigation database 108, and may utilize these two types of user-specific data to augment the spectral signature generated from the road scene image that the roadway sensors 702 captures at a particular point in time.

In block 602, the physiological sensor(s) 704 and the facial sensor(s) 706 may determine physiological data associated with the user at the particular point in time. In some embodiments, the physiological data may include the user's physiological signals monitored by the physiological sensor(s) 704 and the user's behavioral data captured by the facial sensor(s) 706. Non-limiting examples of physiological signals monitored by the physiological sensor(s) 704 include electrocardiography signals (e.g., ECG/EKG signal), respiration signal, skin conductance, skin temperature, muscle tension, etc. Non-limiting examples of user's behavioral data captured by the facial sensor(s) 706 include head movement, eyelid motion, eye saccadic movement, etc. Other examples of physiological signal and behavioral data are possible and contemplated.

In some embodiments, the physiological signals may describe real-time reactions of the user's body correlated with the current outside road scene. As a result, the physiological signals may indicate the user's amount of stress and level of anxiety caused by the road scene ahead and thus can be beneficial in weighing the familiarity of the user with the current road scene situation. As an example, the moving platform 118 travels through a construction zone. The physiological data (e.g., biometric data) of the user captured when the incident occurs indicates that the user's heartbeat rises significantly, his breathing becomes short and fast, and his muscle tension increases (e.g., the user grasps the steering wheel tightly). It can thus be determined that the user is panicking and not familiar with that particular type of construction zone, and to a broader extent, construction zones in general depending on the data points available in the user's familiarity graph.

In some embodiments, the behavioral data may describe real-time physical activities performed by the user in response to the current road scene. In some embodiments, the behavioral data may indicate the user's health status and his level of attention and alertness to the road scene. For example, the distance between the eyelids may indicate whether the user is drowsy or not, the head position may indicate whether the user is properly facing forward, the saccadic eye movement and the head movement from side to side may indicate the user's road scanning degree. The behavioral data thus can be particularly helpful in determining the familiarity of the user with the road scene situation. For example, the user tends to be more focus on driving tasks (e.g., scanning the roadway more frequently, actively responding to potential hazards) and stays more alert (e.g., being awake and concentrated) when dealing with unfamiliar driving situation he/she rarely encountered before. In contrast, the user tends to be less focus and more relaxed if he/she is familiar with the situation.

In some embodiments, when a road scene image of the roadway is captured at a particular point in time, the familiarity level classifier 260 may advantageously utilize the user's behaviors and physiological reactions captured at or around that same particular point in time to generate familiarity index of the user describing the user's familiarity with the road scene depicted in the captured image. In some embodiments, timestamps may be used to associate the road scene image data captured by the roadway sensors 702 with respective user monitoring data captured by the physiological sensor(s) 704 and the facial sensor(s) 706.

In block 604, the familiarity level classifier 260 is executable (e.g., programs the processor(s) 202) to generate a physiological weight value based on the physiological data. In some embodiments, the physiological weight value may be a value (e.g., a metric index) estimating how attentive and active the user is in responding to the current road scene situation. For example, on the scale of 1 to 100, the physical weight value of 95 may indicate that the user is panicking and is fully concentrating on handling the situation, the physical weight value of 95 may indicate that the user is stressed out and pays significant attention to the road scene, while the physical weight value of 21 may indicate that the user is calm and enjoys the current driving situation.

In block 606, the familiarity level classifier 260 is executable (e.g., programs the processor(s) 202) to determine historical navigation data associated with the user. In particular, the familiarity level classifier 260 may retrieve the historical navigation data of the user from the navigation database 108. As discussed elsewhere herein, the historical navigation data may include various types of overall information describing driving instances the user has experienced in his driving history (e.g., list of road segments on which the user has previously travelled, road type, road speed information, time information, ease-of-drive metric, etc.). The historical navigation data can be helpful in evaluating the familiarity of the user to the road scene situation the user is currently confronted with. For example, the user routinely takes State St. in downtown area to go to his office every day. The historical navigation data of the user indicates that the user used State St. to commute fifty times in the last four weeks. The historical navigation data of the user also indicates that the user took the freeway Interstate 15 (I-15) less than ten times in the last six months and the last time was three months ago. In this scenario, a road scene situation happening on the State St. is likely to be more familiar to the user than a similar road scene situation happening on the freeway I-15. For example, the user may already know a shortcut to avoid lane closure situation on State St. but may need substantial amount of guidance to handle a similar situation occurring on the freeway I-15.

In block 608, the familiarity level classifier 260 is executable (e.g., programs the processor(s) 202) to generate a historical navigation weight value based on the historical navigation data. In some embodiments, the historical navigation weight value may be a value indicating the user's familiarity with the road segment included in the road scene given the user's personal driving history. In some embodiments, the historical navigation weight value may be inversely proportional to the number of times the user has taken the road segments within a predetermined historical time period. In some embodiments, the familiarity level classifier 260 may further adjust the historical navigation weight value based on other factors of the historical navigation data (e.g., road type, time information, speed information, ease-of-drive metric, etc.). In some embodiments, the historical navigation weight value for different road segments may be stored in the navigation database 108 and/or memory, and retrieved at runtime or may be calculated at runtime. When computing the familiarity index of the user to a road scene including a particular road segment, the familiarity level classifier 260 may retrieve the historical navigation weight value of the corresponding road segment from the navigation database 108 and/or memory, or may calculate the value in real-time.

In block 610, the familiarity level classifier 260 is executable (e.g., programs the processor(s) 202) to augment the spectral signature describing the current road scene using the physiological weight value and the historical navigation weight value. For example, the familiarity level classifier 260 may append the physiological weight value and the historical navigation weight value as additional vector values to the spectral signature generated from the road scene image data. In some embodiments, these weight values may be factored in by multiplying them with the spectral signature. Other mathematical and non-mathematical compilations are also possible and contemplated. In some embodiments, the augmented spectral signature may be considered a combined signature or an aggregated codeword that gather various information describing the road scene situation (e.g., spectral signature generated from the road scene image, physiological weight value, historical navigation weight value). In some embodiments, the familiarity level classifier 260 may then position the augmented spectral signature relative to existing historical spectral signatures of the corresponding macro-scene cluster in the familiarity graph as discussed in detail with reference to at least FIG. 4C.

Figure 5:
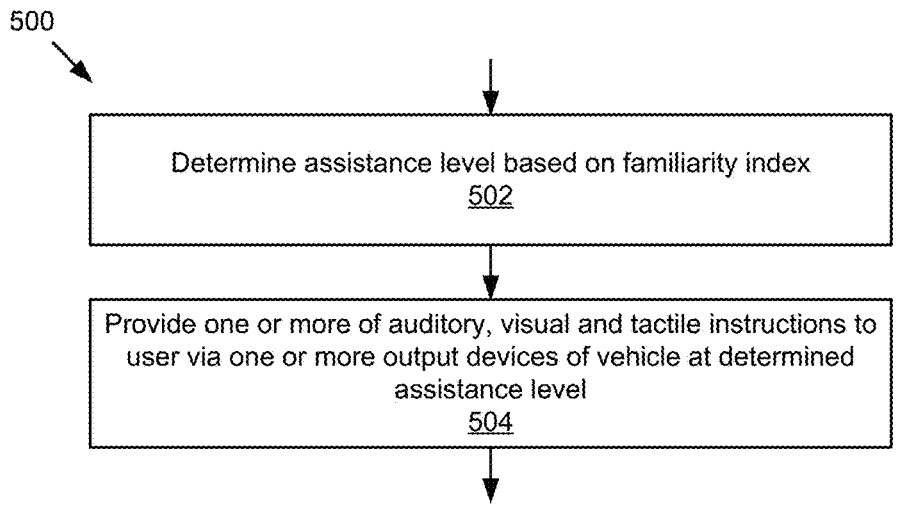
FIG. 5 is a flowchart of an example method for providing instructions to a user in a vehicle at an appropriate level.

FIG. 5 is a flowchart of an example method 500 for providing instructions to a user in a vehicle at an appropriate level adjusted to the estimated familiarity of the user to the road scene situation currently in front of him/her. FIG. 7 illustrates a block diagram of a driver assistance system 700 implemented in the computing device 200 for providing instructions to a user based on a familiarity index. In particular, the user assistance application 122 may receive the familiarity index from the familiarity level classifier 260 of the familiarity application 104 as depicted, and may provide driving guidance to the user at an assistance level corresponding to the familiarity index.

As illustrated in FIG. 7, in various embodiments, the assistance application 122 may include an assistance level selector 712 and an user assistance generator 714, although it should be understood that assistance application 122 may include additional components such as, but not limited to, a configuration engine, a training engine, an encryption engine, etc., and/or these various components may be combined into a single engine or divided into additional engines.

The assistance level selector 712 and user assistance generator 714 may be implemented as software, hardware, or a combination of the foregoing. In some embodiments, assistance level selector 712 and user assistance generator 714 may be communicatively coupled by the bus 208 and/or the processor 202 to one another and/or the other components of the computing device 200. In some embodiments, the components 712 and/or 714 are sets of instructions executable by the processor 202 to provide their functionality. In further embodiments, the components 712 and/or 714 are storable in the memory 204 and are accessible and executable by the processor 202 to provide their functionality. In any of the foregoing embodiments, the components 712 and/or 714 may be adapted for cooperation and communication with the processor 202 and other components of the computing device 200.

In block 502, the assistance level selector 712 is executable (e.g., programs the processor(s) 202) to determine the assistance level based on the familiarity index. In some embodiments, the assistance level may indicate the extent to which the driver assistance system of the moving platform 118 should interact with the user without being a driving distraction. In some embodiments, the assistance level may include a frequency for providing instructions to the user and a level of detail of those instructions.

As an example, the user is driving on a road segment and encounters a first construction zone (e.g., the road scene situation at the time t=t2 as depicted in FIG. 8). The familiarity index generated by the familiarity level classifier 260 may indicate that the user is very familiar with the complexity of the construction zone ahead and thus may need less assistance. The assistance level selector 712 may then determine assistance level of the driver assistance system 700 as providing instructions to the user every five minutes at "low" level of detail. After driving for three miles, the user encounters a second construction zone (e.g., the road scene situation at the time t=t4 as depicted in FIG. 8). This time, the familiarity index generated by the familiarity level classifier 260 may indicate that the user is unfamiliar with the complexity of the construction zone ahead and thus may need more assistance. The assistance level selector 712 may then determine assistance level of the driver assistance system 700 as providing instructions to the user every two minutes at "high" level of detail.

In block 504, the user assistance generator 714 is executable (e.g., programs the processor(s) 202) to generate one or more driving instructions and provide them to the user at the assistance level determined in block 502. In some embodiments, the driving instructions may be one or more of an auditory instructions, visual instructions, tactile instructions, and/or any combination thereof provided to the user via output devices of the vehicle (e.g., speaker system, graphical user interface displayed on a display, vibrating system, etc.). Continuing the example above, to guide the user through the first construction zone, the assistance generator 714 provides driving instructions to the user at five minute interval and the driving instructions may be general and simple such as "move to the next left lane." In contrast, to guide the user through the second construction zone, the assistance generator 714 provides driving instructions to the user at two minute intervals and the driving instructions may include more sophisticated details such as "start slowing down to 25 mph, move to the next left lane in the next five seconds," "maintain the speed at 25 mph, stay in the current lane for quarter of a mile, watch out for debris and construction vehicle in operation," etc. By automatically adapting the intensity of the driving assistance to the user's estimated familiarity (e.g., amp up or tone down the assistance level without user intervention), the driver assistance system 700 can provide more detailed assistance to the user based on micro-scene details when the user is unfamiliar with the road scene, while avoid overwhelming the user with instructions in case of a familiar situation. The driver assistance system 700 therefore can provide driving instructions as needed and avoid causing undesired distraction to the user when he/she is driving.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks.

Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   generating a spectral signature describing one or more dynamic objects and a scene layout of a current road scene;
   identifying, from among one or more scene clusters included in a familiarity graph associated with a user, a road scene cluster corresponding to the current road scene;
   determining a position of the spectral signature relative to other spectral signatures comprising the identified road scene cluster;
   generating a familiarity index estimating familiarity of the user with the current road scene based on the position of the spectral signature;
   determining an assistance level based on the familiarity index of the user; and
   providing one or more of an auditory instruction, a visual instruction, and a tactile instruction to the user via one or more output devices of a vehicle at the determined assistance level.

2. The computer-implemented method of claim 1, wherein generating the spectral signature describing the one or more dynamic objects and the scene layout of the current road scene includes:
   capturing a road scene image of a roadway at a particular point in time using one or more sensors of a vehicle directed to the roadway; and
   generating the spectral signature including a signature vector using the road scene image.

3. The computer-implemented method of claim 2, wherein identifying the road scene cluster corresponding to the current road scene includes:
   categorizing the current road scene into a macro-scene category using the spectral signature; and
   retrieving the road scene cluster including a plurality of historical spectral signatures associated with the macro-scene category, the plurality of historical spectral signatures including a plurality of historical signature vectors, respectively.

4. The computer-implemented method of claim 3, wherein the position of the spectral signature is a position of the signature vector, and wherein determining the position of the spectral signature relative to the other spectral signatures includes:
   determining the position of the signature vector relative to respective positions of the plurality of historical signature vectors of the road scene cluster.

5. The computer-implemented method of claim 3, wherein the macro-scene category includes one of an urban category, a rural category, a residential category, a construction zone category, a highway category, and an accident category.

6. The computer-implemented method of claim 1, further comprising:
   updating the road scene cluster to include the spectral signature.

7. The computer-implemented method of claim 1, wherein generating the familiarity index estimating the familiarity of the user with the current road scene includes:
   determining a set of nested familiarity zones for the road scene cluster based on a density of spectral signatures within the road scene cluster; and
   determining the familiarity index of the user to the current road scene by determining the position of the spectral signature within the set of nested familiarity zones.

8. The computer-implemented method of claim 1, wherein the assistance level includes one or more of 1) a frequency for providing the one or more of the auditory instruction, the visual instruction, and the tactile instruction to the user, and 2) a level of detail of the one or more of the auditory instruction, the visual instruction, and the tactile instruction.

9. The computer-implemented method of claim 1, wherein the current road scene is depicted in a road scene image being captured at a particular point in time, the method further comprises:
  determining physiological data associated with the user at the particular point in time;
  generating a physiological weight value based on the physiological data; and
  augmenting the spectral signature using the physiological weight value.

10. The computer-implemented method of claim 9, wherein the physiological data associated with the user includes one or more of head movement, eye movement, electrocardiography data, respiration data, skin conductance, and muscle tension of the user at the particular point in time.

11. The computer-implemented method of claim 1, further comprising:
  determining historical navigation data associated with the user;
  generating a historical navigation weight value based on the historical navigation data; and
  augmenting the spectral signature using the historical navigation weight value.

12. The computer-implemented method of claim 11, wherein the historical navigation data associated with the user includes one or more of a road name, a road type, road speed information, and time information associated with one or more road segments previously travelled by the user.

13. A system comprising:
  one or more processors;
  one or more memories storing instructions that, when executed by the one or more processors, cause the system to:
    generate a spectral signature describing one or more dynamic objects and a scene layout of a current road scene;
    identify, from among one or more scene clusters included in a familiarity graph associated with a user, a road scene cluster corresponding to the current road scene;
    determine a position of the spectral signature relative to other spectral signatures comprising the identified road scene cluster;
    generate a familiarity index estimating familiarity of the user with the current road scene based on the position of the spectral signature;
    determine an assistance level based on the familiarity index of the user; and
    provide one or more of an auditory instruction, a visual instruction, and a tactile instruction to the user via one or more output devices of a vehicle at the determined assistance level.

14. The system of claim 13, wherein to generate the spectral signature describing the one or more dynamic objects and the scene layout of the current road scene includes:
  capturing a road scene image of a roadway at a particular point in time using one or more sensors of a vehicle directed to the roadway; and
  generating the spectral signature including a signature vector using the road scene image.

15. The system of claim 14, wherein to identify the road scene cluster corresponding to the current road scene includes:
  categorizing the current road scene into a macro-scene category using the spectral signature; and
  retrieving the road scene cluster including a plurality of historical spectral signatures associated with the macro-scene category, the plurality of historical spectral signatures including a plurality of historical signature vectors, respectively.

16. The system of claim 15, wherein the position of the spectral signature is a position of the signature vector, and wherein to determine the position of the spectral signature relative to the other spectral signatures includes:
  determining the position of the signature vector relative to respective positions of the plurality of historical signature vectors of the road scene cluster.

17. The system of claim 15, wherein the macro-scene category includes one of an urban category, a rural category, a residential category, a construction zone category, a highway category, and an accident category.

18. The system of claim 13, wherein the instructions, when executed by the one or more processors, further cause the system to:
  update the road scene cluster to include the spectral signature.

19. The system of claim 13, wherein to generate the familiarity index estimating the familiarity of the user with the current road scene includes:
  determining a set of nested familiarity zones for the road scene cluster based on a density of spectral signatures within the road scene cluster; and
  determining the familiarity index of the user to the current road scene by determining the position of the spectral signature within the set of nested familiarity zones.

20. The system of claim 13, wherein the assistance level includes one or more of 1) a frequency for providing the one or more of the auditory instruction, the visual instruction, and the tactile instruction to the user, and 2) a level of detail of the one or more of the auditory instruction, the visual instruction, and the tactile instruction.

21. The system of claim 13, wherein the current road scene is depicted in a road scene image being captured at a particular point in time, and wherein the instructions, when executed by the one or more processors, further cause the system to:
  determine physiological data associated with the user at the particular point in time;
  generate a physiological weight value based on the physiological data; and
  augment the spectral signature using the physiological weight value.

22. The system of claim 21, wherein the physiological data associated with the user includes one or more of head movement, eye movement, electrocardiography data, respiration data, skin conductance, and muscle tension of the user at the particular point in time.

23. The system of claim 13, wherein the instructions, when executed by the one or more processors, further cause the system to:
  determine historical navigation data associated with the user;
  generate a historical navigation weight value based on the historical navigation data; and
  augment the spectral signature using the historical navigation weight value.

24. The system of claim 23, wherein the historical navigation data associated with the user includes one or more of a road name, a road type, road speed information, and time information associated with one or more road segments previously travelled by the user.

\* \* \* \* \*